United States Patent
Coventry et al.

(10) Patent No.: US 12,401,532 B2
(45) Date of Patent: Aug. 26, 2025

(54) METHOD AND APPARATUS FOR PRODUCING VERIFIABLE RANDOMNESS WITHIN A DECENTRALIZED COMPUTING NETWORK

(71) Applicant: SmartContract Chainlink Limited SEZC, Grand Cayman (KY)

(72) Inventors: Alex Coventry, Grand Cayman (KY); Lorenz Breidenbach, Grand Cayman (KY); Christian Cachin, Grand Cayman (KY)

(73) Assignee: SmartContract Chainlink Limited SEZC, Grand Cayman (KY)

( * ) Notice: Subject to any disclaimer, the term of this patent is extended or adjusted under 35 U.S.C. 154(b) by 91 days.

(21) Appl. No.: 18/207,888

(22) Filed: Jun. 9, 2023

(65) Prior Publication Data

US 2023/0318857 A1    Oct. 5, 2023

Related U.S. Application Data

(63) Continuation-in-part of application No. 17/678,769, filed on Feb. 23, 2022, now Pat. No. 12,074,853, and a continuation-in-part of application No. 17/317,490, filed on May 11, 2021.

(60) Provisional application No. 63/350,445, filed on Jun. 9, 2022, provisional application No. 63/152,804, filed on Feb. 23, 2021, provisional application No. 63/023,221, filed on May 11, 2020.

(51) Int. Cl.
*G06F 16/00* (2019.01)
*G06F 16/2458* (2019.01)
*H04L 9/00* (2022.01)
*H04L 9/30* (2006.01)

(52) U.S. Cl.
CPC ............ *H04L 9/50* (2022.05); *G06F 16/2471* (2019.01); *H04L 9/30* (2013.01)

(58) Field of Classification Search
CPC . H04L 9/50; H04L 9/30; H04L 9/0841; H04L 9/085; H04L 9/3218; H04L 9/3255; H04L 63/0428; G06F 16/2471; G06F 16/248; G06F 16/27
See application file for complete search history.

(56) References Cited

U.S. PATENT DOCUMENTS

| | | | |
|---|---|---|---|
| 2020/0074552 A1* | 3/2020 | Shier | G06Q 20/10 |
| 2020/0311312 A1* | 10/2020 | Yu | H04L 9/0897 |
| 2020/0320340 A1 | 10/2020 | Wentz | |
| 2024/0414228 A1* | 12/2024 | Cao | H04L 67/1097 |

OTHER PUBLICATIONS

Berger et al., "OraclesLink: An architecture for secure oracle usage", IEEE, 978-1-7281-8370, pp. 66-72 (Year 2020).

* cited by examiner

*Primary Examiner* — Alexander Khong
(74) *Attorney, Agent, or Firm* — Potomac Law Group, PLLC; Marc S. Kaufman

(57) ABSTRACT

A system and method for providing a randomness function to a smart contact on a decentralized network. A decentralized oracle network receives a request for at least one random value to be supplied to a smart contract executing on a decentralized network, the request including a seed. The oracle network generates the at least one random value based reports from a verified quorum of oracle nodes of the oracle network. The oracle network broadcasts a report including a randomness function to the smart contract.

12 Claims, 1 Drawing Sheet

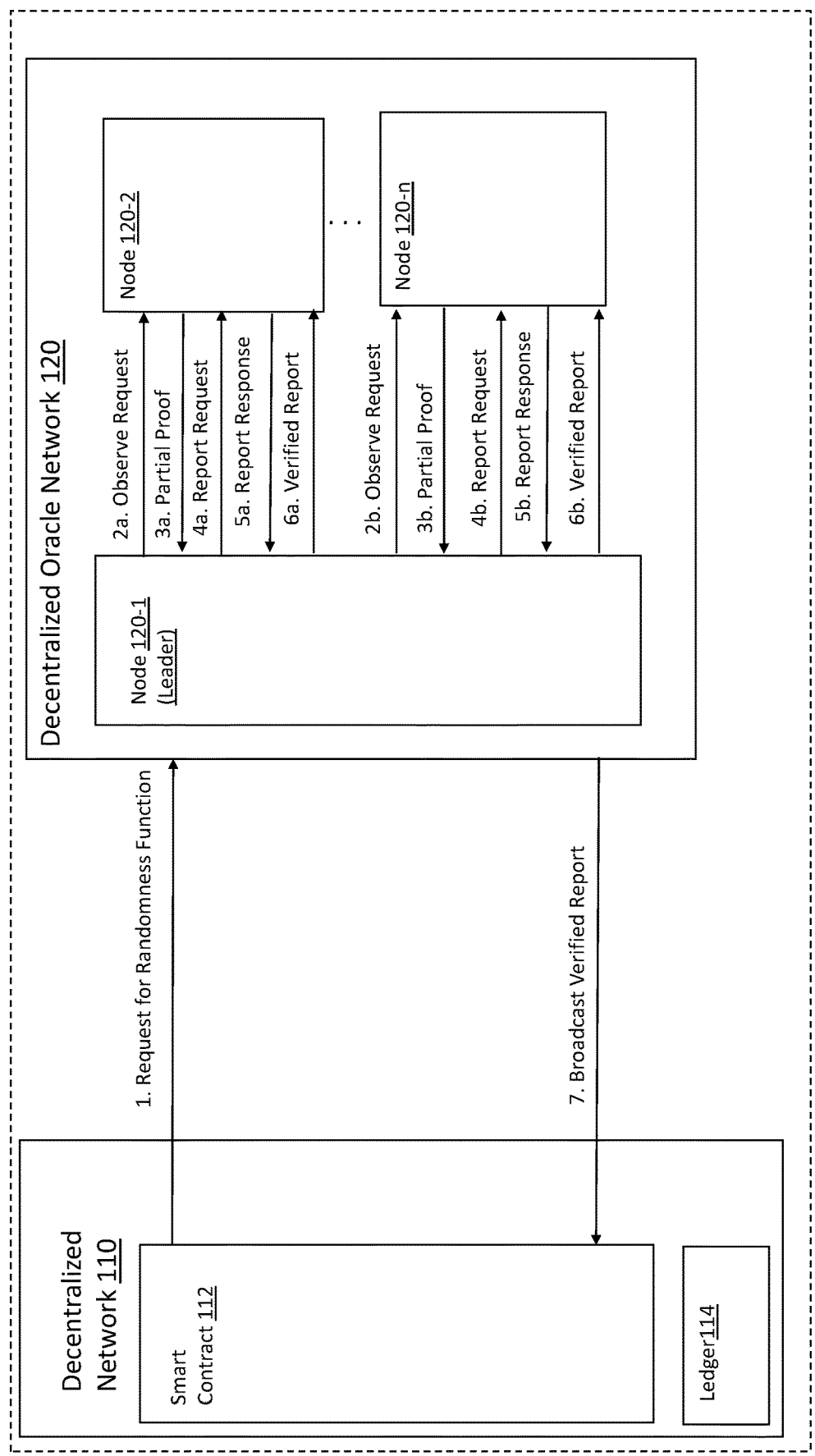

METHOD AND APPARATUS FOR PRODUCING VERIFIABLE RANDOMNESS WITHIN A DECENTRALIZED COMPUTING NETWORK

RELATED APPLICATION DATA

This application is a continuation-in-part of U.S. application Ser. No. 17/678,769 filed on Feb. 23, 2022 and U.S. patent application Ser. No. 17/317,490 filed on May 11, 2021 and claims benefit to U.S. Prov. App. Ser. No. 63/350,445 filed on Jun. 9, 2022, the entire disclosures of which are incorporated herein

BACKGROUND

A distributed ledger (also called a shared ledger or distributed ledger technology or DLT) is a consensus of replicated, shared, and synchronized digital data distributed across multiple computing nodes. In many implementations of distributed ledgers, such as the Bitcoin Blockchain, there is no central trusted authority. Therefore, distributed ledgers are often referred to as "decentralized networks."

The distributed ledger database can be replicated across multiple nodes (potentially many thousands of nodes) communicating over a peer-to-peer network. Each node can replicate a copy of the ledger update themselves with the new, correct copy of the ledger using one or more of various known consensus algorithms. Security can be accomplished through cryptographic keys and signatures. The application of distributed ledgers, such as blockchains, has been proposed for various financial transactions, such as funds transfers and equities trading, and for a myriad of other applications in which it is desirable to be able to transact directly without the need for a trusted centralized party, such as a bank or a government entity. The combination of a peer-to-peer distributed ledger, consensus algorithms and cryptographic techniques results in an immutable record; data can be added to the ledger but, once the data is agreed on by the participants, the data cannot be removed from the ledger or changed on the ledger.

A "smart contract" is computer executable code that is stored and executes, at least in part, on a decentralized network. It is known to use smart contracts to affect various business processes in a predictable manner. Smart contracts have been utilized to affect various critical processes, such as foreign exchange, insurance claims payment, settlement of bets and the like. Typically, a smart contract will receive one or more inputs and generate an output. As a very simple example, a smart contact can receive weather precipitation data and make payments to insured farmers if the precipitation over a predetermined period of time is less than a threshold value. Nodes providing external input data to a smart contract, such as the weather data in the example above, are known as "oracles." Smart contracts can be the basis for decentralized applications (Dapps) which provide various functions to users over a decentralized network.

In many applications, randomness is required for security without compromising the verifiable deterministic operation of a smart contract. It is well known to leverage randomness for computer data security. For example, SSL encryption, which secures the internet, relies on randomness. Various random number generation algorithms are well known and can be applied by a centralized/trusted entity. As an example. CLOUDFLARE™ uses hundreds of lava lamps to generate random numbers. A camera takes photos of the lamps at regular intervals and sends the images to Cloudflare servers. The digital image data is treated as a string of random numbers that the Cloudflare servers can then use for creating secure encryption keys.

In a decentralized system, randomness must come from participants in the network. Such participants cannot always be trusted. Network participants could manipulate the "randomness" for their own benefit. Existing solutions for providing randomness to smart contracts have significant limitations. For example, the use of existing on-chain data like a blockhash, and/or various off-chain randomness both present limitations. For example, suppose a contract makes decisions based on the parity of the last bit in the hash of the block at a certain height. This looks like a 50/50 outcome, but consider that a miner (or coalition of miners) on the Ethereum blockchain who produces one third of the blocks on average may decide to throw out winning blocks for which the last bit of the blockhash is 1, forgoing the block reward of approximately 2-3 ETH. In this case, the miner(s) could bias the zero outcome from a reliable 50% likelihood to a $\frac{2}{3}$rds likelihood, leading to a potential loss of user funds from any smart contract relying on this method of randomness generation. If the contract's zero-bit behavior would benefit the miner by more than 12-18 ETH, this behavior would be economically rational.

To avoid this scenario, it is known to utilize off-chain solutions, where a random number is generated off-chain and brought on-chain. However, without cryptographic verification that the off-chain value is unbiased, there's an opportunity for the result to be manipulated by the off-chain provider and/or by the data transport layer putting that random value on-chain. Likewise, the application's users are forced to assume that the randomness is produced fairly and has been brought on-chain without being changed before being provided to the smart contract. Additional key trade-offs and security risks when relying on a source of randomness for a smart contract include:

Inaccessibility by or incompatibility with smart contracts;
Manipulation by the random number generator's centralized operator;
Exploitation by a blockchain's miners as one of the application's users; and
Unreasonably high trust requirements from end-users of the application.

SUMMARY

For the reasons set forth above, smart contracts in a decentralized environment, such as a blockchain network, cannot accept just any randomness. There is a need for "verifiable randomness", essentially randomness with a corresponding cryptographic proof. Just as network participants can validate blocks in a blockchain, so too must the randomness input into those blocks be verifiable to maintain the same level of determinism desired in a decentralized network such as a blockchain network. Verifiable randomness is a known cryptographic concept. U.S. patent application Ser. No. 17/317,490 filed on May 11, 2021, discloses a secured oracle which provides a verifiable randomness function. However, applicant has extended this concept to provide a verified randomness function (VRF) and an associated Distributed Key Generation (DKG) protocol that is executed by a decentralized oracle network instead of a single oracle.

One aspect of the invention is a method for providing a randomness function to a smart contact on a decentralized network, the method comprising: receiving, by an oracle network comprised of a plurality of decentralized nodes, a request for at least one random value to be supplied to a smart contract executing on a decentralized network; (a) in response to the request for at least one random value, a leader node of the plurality of decentralized nodes sending an observe request to follower nodes of the plurality of decentralized nodes, wherein the request comes from a decentralized network; (b) each of the follower nodes constructing one or more partial proofs for a randomness function; (c) each of the follower nodes sending the one or more partial proofs for a randomness function to the leader node, wherein each partial proof includes a block indicator and a hash of the block indicated by the block indicator; (d) aggregating, by the leader node the partial VRF proofs for which a predetermined quorum of the follower nodes have provided; (e) sending, by the leader node, a Report Request message, which includes the hash for a block at least as old as the oldest block indicated by the block indicators; (f) validating and signing, by each of the follower nodes, a report response message corresponding to the report request message; (g) each of the follower nodes sending the report response message including a verifiable randomness function to the leader node; (h) verifying, by the leader node, the report response message; (i) sending, by the leader node, the verified report response message to the follower nodes; and (j) broadcasting, by the follower nodes, the verified report response message to a smart contract on the decentralized network. Another aspect of the invention is a computer system for accomplishing the randomness function.

BRIEF DESCRIPTION OF THE DRAWING

The foregoing summary, as well as the following detailed description of the invention, will be better understood when read in conjunction with the appended drawings. For the purpose of illustrating the invention, there are shown in the drawings various disclosed implementations. It should be understood, however, that the invention is not limited to the precise arrangements and instrumentalities shown.

FIG. 1 is a high-level schematic illustration of the architecture and data flow of a decentralized system in accordance with disclosed implementations

DETAILED DESCRIPTION

Many DApps will benefit from a verifiably correct source of randomness to enable verification of their own fair operation. Examples include, Non-Fungible Tokens (NFTs), gaming DApps whose outcomes are randomized, and unconventional financial instruments (such as no-loss savings games, which allocate funds to random winners). Other blockchain and non-blockchain applications also require secure sources of randomness, including selection of decentralized-system committees and the execution of lotteries.

While block hashes can serve as a source of unpredictable randomness, they are vulnerable to manipulation by adversarial miners (and to some extent by users submitting transactions). The disclosed implementations offer a considerably more secure alternative. VRF and DKG functions are provided by a decentralized oracle network in which oracle nodes can use an Offchain Reporting Protocol (OCR), such as is described in U.S. patent application Ser. No. 17/678, 769 filed on Feb. 23, 2022. Disclosed implementations leverage such a protocol to reduce the likelihood of damage from rogue oracles acting in concert. For example, there can be n oracles (or nodes) that monitor an off-chain data stream or, in this instance, provide a randomness function. Periodically, the oracles, jointly and in concert, run the protocol to sign a report containing observations from many of the n oracles. Once a report is produced successfully, one or multiple transmitters sampled from the oracle set transmit the report to a smart contract C running on a "main" (e.g., a blockchain such Ethereum). A smart contract C can validate the report, pay each oracle that contributed an observation to the report (e.g., through an onchain transaction), and provide the reported values to consuming smart contracts on-chain.

The protocol can be organized into a sequence of epochs, each divided into a sequence of rounds. Each epoch, a leader is selected at random. Each round within an epoch, the leader broadcasts an OBSERVEREQ message to all participants. Participants respond with OBSERVE messages containing their contributions. The leader broadcasts a REPORTREQ message containing the contributions it's received. Participants deterministically construct a REPORT message based on valid contributions provided in the REPORTREQ, sign it and send it to the leader. Leader broadcasts the REPORT message, along with a quorum of participant signatures, in a FINAL message. Followers queue the report for transmission to an onchain contract, with a staggered delay followed by a check on whether the report has already been transmitted so that not too many followers are trying to transmit at once.

Both the DKG and VRF protocols use the Offchain Reporting (OCR) protocol for internode communication. The overall communication flow is as follows:

The protocol is organized into a sequence of epochs, each divided into a sequence of rounds. Each epoch, a leader is selected at random. Each round within an epoch, the leader broadcasts an OBSERVEREQ message to all participants. Participants respond with OBSERVE messages containing their contributions. The leader broadcasts a REPORTREQ message containing the contributions it's received. Participants deterministically construct a REPORT message based on valid contributions provided in the REPORTREQ, sign it and send it to the leader. Leader broadcasts the REPORT message, along with a quorum of participant signatures, in a FINAL message. Followers queue the report for transmission to an onchain contract, with a staggered delay followed by a check on whether the report has already been transmitted so that not too many followers are trying to transmit at once. The OCR protocol allows a caller to specify the message contents and semantics by implementing the following methods, referred to below as "plugin" methods:

```
type ReportingPlugin interface {
    // Observation gets an observation from the underlying data source.
        Returns // a value or an error.
        Observation (context.Context, ReportTimestamp, Query)
    (Observation, error)
        // Decides whether a report (destined for the contract) should
        be generated // in this round. If yes, also constructs the report.
        Report( context.Context, ReportTimestamp, Query, )
    [ ]AttributedObservation,
        (bool, Report, error)
        // Decides whether a report should be accepted for transmission.
        ShouldAcceptFinalizedReport( context.Context,
        ReportTimestamp, Report, )
        (bool, error)
        // Decides whether the given report should actually be broadcast
    to the // contract. This is invoked just before the broadcast occurs.
        ShouldTransmitAcceptedReport( context.Context,
        ReportTimestamp, Report, )
        (bool, error)
    }
```

Secret shares must be constructed to allow the nodes (also referred to as "players" in this context) to authenticate one another. In the well-known Pedersen/Rabin-style Verifiable Secret Sharing (VSS), the leader (also referred to as a "dealer" in this context) shares the encrypted evaluation of its polynomial, f(i), with player i. Traditionally, player i must verify f(i) against the dealer's commitments to the coefficients of f, and raise a complaint with a post-hoc proof, if the share is invalid. This complicates the analysis of DKG in the asynchronous case. For instance, the scheme only guarantees that n−2f≥f+1 participants will receive valid shares. By making the shares publicly verifiable, though, all participants can verify that all shares are correct.

Most existing publicly verifiable secret sharing (PVSS) methods share a group element instead of a scalar, which is awkward for a Boneh-Lynn-Shacham (BLS)-based VRF. However, there are ways to homomorphically encrypt f(i) so that the ciphertext can be publicly verified in zero knowledge against the point f(i)·g, which can be computed from the commitments to f's coefficients. A simple way is to encrypt each bit of f(i) separately using ElGamal. Let $b_k$ be the kth bit-pair of f(i), and $(x_k \cdot g, x_k Y_i + b_k \cdot g)$ be the ElGamal encryption, where g is the canonical group generator, $x_k$ is the blinding factor, and $Y_i = y_i \cdot g$ is player i's public key.

To prove that these are encryptions of the bit-pairs comprising f(i), first note that $f(i) = \sum_k 4^k b_k$, so $B_i = \sum_k 4^k \cdot (X_k \cdot Y_i + b_k \cdot g) - f(i) \cdot g = (\sum_k 4^k x_k) \cdot Y_i$. Thus proof of known discrete log for $B_i$ base $Y_i$ shows that as long as all $b_k \in \{0,1,2,3\}$, the encryptions $x_k \cdot Y_i + b_k \cdot g$ encode f(i). Secondly, to prove in zero knowledge that each ElGamal ciphertext $(x_k \cdot g, c_k = x_k \cdot Y_i + b_k \cdot g)$ properly encodes a bit pair for public key $Y_i$, we construct a ring signature in the cartesian product of the elliptic curve with itself, E×E. Note that $b_k \in \{0,1,2,3\}$ if and only if one of $\{c_k - b \cdot g\}_{b=0}^3$ is of the form $x_k \cdot Y_i$, so the prover can sign a message using one of $\{(x_k \cdot g, c_k - b \cdot g)^3_{b=1}\}$ as a public key with secret key $x_k$ and generator $(g, Y_i)$. Hence, it can construct a ring signature using $\{(x_k \cdot g, c_k - b \cdot g)\}^3_{b=0}$ as the public keys, proving that the ciphertext is of the correct form without leaking the value of $b_k$.

This ring-signature trick comes from the pre-bulletproofs design for confidential transactions. "Bulletproofs" is a well-known, non-interactive, zero-knowledge proof protocol with very short proofs and without need for a trusted setup The bandwidth required each bit pair, is two points for the ElGamal encryption (32 bytes each), plus five scalars for the ring signature over $c_k$, $c_k - g$, $c_k - 2g$ and $c_k - 3g$, plus two scalars for a proof of knowledge of exponent for $B_i$, for a total of (2×32+5×32)×128+2×128=28928 bytes.

Disclosed implementations extend this to encryptions of larger m-tuples of bits to prove that each encryption $c_k = x_k \cdot Y_i + v_k \cdot g$ decrypts to a value $v_k \in [0, \ldots, 2^m - 1]$, and lets the receiver decrypt each unblinded multiple $v_k \cdot g$ using a "baby-step giant-step" algorithm (a well-known algorithm for computing the discrete logarithm or order of an element in a finite abelian group). That the $v_k$'s represent the bits of f(i) is proven similarly: show that $\sum_k 2^{km} \cdot c_k - f(i) \cdot g$ has the same discrete log base $Y_i$ as $\sum_k 2^{km} \cdot (x_k \cdot g)$ base g. To prove in zero knowledge that the ElGamal encodings of the blinding factors are correct, use the Fiat-Shamir heuristic to sample coefficients $s_k$ given the full ElGamal encryptions, and provide $\sum_k s_k \cdot c_k$ and $(\sum_k s_k \lambda v_k) \cdot g$, then prove in zero knowledge that the latter is a known multiple of g, and that $(\sum_k s_k \cdot c_k) - (\sum_k s_k \times v_k) \cdot g$ has the same discrete log base $Y_i$ as $\sum_k s_k \cdot (x_i \cdot g)$. (The ring-signature trick used above only works as long as the number of possible values for $v_k$ is very small.) Both of these proof steps can be aggregated over i, meaning that the asymptotic amortized bandwidth needed for them as the number of participants grows is 0.

Assuming that $x \in_R S$ means securely uniformly sampling x from S, q is the order of $G_1$ from the Alt-BN128 system, g is the canonical generator of $G_1$, a·h for $a \in Zq, h \in G_1$ means scalar multiplication in the group action, i.e., $\Sigma_{i=1}^a h$, and $Y_i = y_i \cdot g$ is the initial public private keypair for node i. The public keys for these initial keypairs should come with proofs of knowledge of exponent during initialization of the protocol. The notation H(m) is the keccak256 of bitstring m. The notation a$\|$b means the concatenation of the bitstring representations of a and b.

The value H(m) is often interpreted as an element of Zq by treating it as a big-endian representation of an element of $\{0, \ldots, 2^{156}-1\}$ and taking the remainder mod q. Since q=0x30644e72e131a029b85045b68181585d2833e84879b-9709143e1f593f0000001, and it is important that H(m) is distributed uniformly over Zq, any calculation involving H(m) is repeated with new ephemeral keys or an incremented nonce until $H(m) < 5q = b2^{256}/qcq$. The fractional remainder $$\frac{2^{256} \bmod q}{2^{256}}$$

is about 5.5%, so this is much more important in the context of $G_1$ than it is for sep256k1, where sampling $x \in \{0, \ldots, 2^{256}-1\}$ such that x>#secp256k1 is cryptographically infeasible.

To simplify notation, the items which follow describe the construction of the publicly verifiable share by a fixed node i for a fixed node j, and the indexing of the intermediate variable names by i and j is left implicit when it seems clear. E.g., f is actually $f_i$, $b_k$ is actually $b_{ijk}$, etc.

The node i selects a secret polynomial $f(x) = a_0 + a_1 x + \ldots + a_r x^r \in Zq[x]$, where each $a_p \in_R Zq$. It publicly commits to these coefficients using $C_p = a_p \cdot g$. For each node j, i computes a secret share f(j). Node i publicly encrypts f(j): Let $b_k$ be the kth bit pair of f(j) (little-endian order), so $f(j) = \sum_{k=0}^{127} b_k 4^k$. Node i encrypts $b_k$ using ElGamal encryption: It samples a secret blinding factor $x_k \in_R Zq$, and the encryption is $e_k = (I_k^0, I_k) = (x_k \cdot g, x_k \cdot Y_j + b_k \cdot g)$. The ex's form the ciphertext for f(j).

Node i publicly proves it knows $b = \sum_k 4^k x_k$ such that $\sigma_j = (\sum_k 4^k \cdot I_k) - f(j) \cdot g = b \cdot Y_j$, by constructing a Camenisch/Stadler signature of knowledge of discrete log on the message $m_j = (sid, i, j, \{C_p\}_p, \{e_k\}_k)$, SKDL$(Y_j, \sigma, m_j)$. Node i samples an ephemeral secret key $k_e \in_R Zq \setminus \{0\}$, and computes $c_j = H(m_j \| \sigma_j k Y_j k k_e \cdot Y_j)$ then sets $s_j = k_e - c_j b$ mod q. The calculation is repeated with a new $k_e$ until $c_j < 5q$, $c_j$ mod q 6=0, and $s_j 6 = 0$. The probability of success on each iteration is about 95%. The signature is $(c_j \bmod q, s_j)$ Node i publicly proves for each k that the discrete log of $l'_k$ base g is equal to the discrete log of $l_k$, $l_k - g$, $l_k - 2 \cdot g$ or $l_k - 3 \cdot q$ base $Y_j$. This could be done using SEQDL

[²₁]

(g, $Y_j$; $l'_k$, $l_k$, $l'_k$, $l_k - g$, m) construction on the message $m_j$. This is equivalent to working over $G_1 \times G_1$, with the usual product-group action, and using SKDL

[⁴₁]

$(g, Y_j)$, $(l'_k, l_k)$, $(l'_k, l_k-g)$, $(l'_k, l_k-2 \cdot g)$, $(l'_k, l_k-3 \cdot g)$, m), which is very similar to a ring signature using $(g, Y_j)$ as the generator and $(l'_k, l_k)$, $(l'_k, l_k-g)$, $(l'_k, l_k-2 \cdot g)$, $(l_k^0, l_k-3 \cdot g)$ as the candidate public keys. However, a ring signature takes less bandwidth and this is the most expensive part, so let's use that.

The proof that this is a valid proof of knowledge of the discrete log of one of $(l'_k, l_k-g)$, $(l'_l, l_k-2 \cdot g)$, $(l_k^0, l_k-3 \cdot g)$ follows from the unforgeability of ring signatures. The full share from i is then ($\{C_0, \ldots, C_t\}$, $((e_{jk}, (c_{jk0}, s_{jk0}, s_{jk1}, s_{jk2}; s_{jk3})_{k=0}^{127}, (c_j, s_j))_{j=1}^n)$. In other words, the commitments to the coefficients of $f_i$, and for each recipient j, the ElGamal encryptions $e_{ijk}=(l_{ijk}^0, l_{ijk})$ for each bit pair of $f(j)$, along with the ring-signature proofs $(c_{ijk0}, s_{ijk0}, s_{ijk1}, s_{jk2}, s_{jk3})$ that they correctly encrypt a single bit pair, and finally the proof $(c_{ij}, s_{ij})$ that the bit pairs correctly encode $f(j)$. (The scalars in the proofs are all mod q.)

Given the above share from player i validity is checked as follows for each player j:

Compute $$\phi = \sum_{m=0}^{t} j^m \cdot C_m = f(j) \cdot g.$$

This does not reveal $f(j)$, due to the Diffie-Hellman assumption.

Compute $\sigma = (\Sigma_{k=0}^{127} 4^k \cdot (l_k)) - \phi$

Verify that $c_j, s_j, 6=0$, and compute
$c^0_j = H(m_j k^\sigma k Y_j k s_j \cdot Y_j + c_j \cdot \sigma)$,
then verify that $c^0_j < 5q$ and $c^0_j \equiv c_j \mod q$ This should be the case because $s_j \cdot Y_j + c_j \cdot \sigma = k_e \cdot Y_j$.

For each k, verify the ring signature $(C_0, s_{jk0}, s_{jk1}, s_{jk2}, s_{jk3})$ against the public keys $(l'_k, l_k)$, $(l'_k, l_k-2 \cdot g)$, $(l_k^0, l_k-3 \cdot g)$.

The ciphertext for each bit pair actually encodes a bit pair: Since there is a ring signature on the public keys $(l'_k, l_k)$, $(l'_k, l_k-g)$, $(l'_k, l_k-2 \cdot g)$, and $(l_k^0, l_k-3 \cdot g)$, player i must know some $x_k$ such that $(l'_k, l_k) = x_k \cdot (g, Y_j) + b \cdot (0, g)$, where $b \in \{0, 1, 2, 3\}$. Hence $l'_k = x_k \cdot g$, and $l_k = x_k \cdot Y_j + b \cdot g$. Since i does not know the secret key for $Y_j$, $x_k \cdot g$ and $x_k \cdot Y_j + b \cdot g$ and are Pedersen commitments for player i, and by the Diffie-Hellman assumption, i can only know one such representation of $l_k$. Since $l_K^0 = x_k \cdot g$ and $l_k = x_k \cdot Y_j + b_k \cdot g$, $l'_k$ commits to the correct blinding factor for the ElGamal encryption of $l_k$. Hence, when player j removes the blinding factor $y_j \cdot l'_k = y_j \cdot (x_k \cdot g) = x_k \cdot Y_j$ from $l_k$, it will get 0, g, 2·g, or 3·g, (corresponding to $b_k=0$, 1, 2, or 3, respectively).

The bits encode $f(j)$ The argument that:

$$\phi = \sum_{m=0}^{t} j^m \cdot C_m = \sum_{m=0}^{t} j^m \cdot (a_m \cdot g) = \left( \sum_{m=0}^{t} a_m j^m \right) \cdot g = f(j) \cdot g$$

is the same as for the traditional DKG. Since $(c_j, s_j)$ is a correct signature of knowledge of discrete log of $(^P_k 4^k \cdot l_k) - f(j) \cdot g$ with respect to the generator $Y_j$, and i does not know the discrete log of $Y_j$, it follows that $(^P_k 4^k \cdot l_k) - f(j) \cdot g = b$. Y for some $b \in Zq \setminus \{0\}$ known to i. Thus i knows a Pedersen commitment $(^P_k 4^k \cdot l_k) = b \cdot Y_j + f(j) \cdot g$, implying that the $l_k$'s encode the bits for $f(j)$.

The PVSS operates over the elliptic-curve group $G_1$, and consists of the following algorithms. The algorithm pseudo-codes include the player index of the dealer, since the PVSS will be used as part of a DKG, and those indices are useful for domain separation.

KeyGen: $( )7 \rightarrow (pk, sk) \in G_1 \times Zq$. Run by each player to establish a static key which the dealer will use to encrypt the player's shares. Here, $sk \in {}_R Zq$ and $pk = sk \cdot g$, where g is $G_1$'s canonical generator, as usual.

GenPoly: $t \in N \ 7 \rightarrow f(x) \in Zq[x]$. Run by dealer to generate its secret degree-t polynomial $f(x) = \Sigma_{i=0}^{t} a_i x^i$. Here, $a_i \in_R Zq$, as usual.

Share: $\mathbb{Z}_q[x] \times \mathbb{Z}_q \times G_1 \times DG \rightarrow G_1^t \times ((G_1^2) \times (\mathbb{Z}_q^5)^{128} \times \mathbb{Z}_q^2 \times G_2^2$ (Call the codomain CD.) To construct the secret shares, the dealer encrypts the share $f(j)$ for the jth player with public key pk, given secret polynomial f, i.e. input $(f(x), j, pk) \in Zq[x] \times Zq \times G_1$. See section "Construction of Secret Shares" for details of this function. The output is for sharing with all players. The slots in CD are $G_1^t$: the coefficient commitments for $f(x)$. These are the same as in a traditional Feldman VSS.

$((G_1^2) \times (\mathbb{Z}_q^5)^{128}$: the ElGamal encryptions of the bit pairs of $f(j)$, and proofs of their correctness. These correspond to the encrypted communication of $f(j)$ to player j, in a traditional Feldman VSS. The $G_1^2$ factors are are denoted as $(l_k, l_k^0)$, in the description above, and the $Z_q^5$ factors as $(c_{k0}, s_{k0}, s_{k1}, s_{k2}, s_{k3})$, the output of RINGSIGNATURE, where the notation in Algorithm 1, RINGSIGNATURE $[h(g,pk)i]$ means that the signature is taken over the cyclic group $h(g,pk)i$ generated by $(g,pk) \in E \times E$. The ring-signature security proof does not depend on the decoy candidate keys lying in the cyclic subgroup; only the public key actually used to construct the signature needs to depend on the decoy candidate keys.

$Z^2_q$: the proof that the bit pairs from the ElGamal ciphertexts encode $f(j)$. They are denoted as $(c,s)$, in the description above.

$G_2^2$: The first slot is the translation of the target player j's subkey in this PVSS, $f(j) \cdot G_1$, to $G_2$, i.e. $f(j) \cdot g_2$. The second is the translation of the dealers secret key, $C_0 = a_0 \cdot g_1$ to $a_0 \cdot g_2$. When we're not making a DKG for a pairing system, these slots can be ignored. See the TRANSLATEKEY, VERIFYTRANSLATION method descriptions below.

Below are example algorithms in pseudo code.

---

Algorithm 1: Construction of a Publicly-Verifiable Secret Share

---

1: function ELGAMALBITPAIR(m $\in \cup_{l=0}^{x} \{0, 1\}$, b $\in (0, 1, 2, 3)$, pk $\in G_1$)
2:     x $\in_R \mathbb{Z}_q$
3:     l' $\leftarrow$ x · g
4:     l  x · pk + b · g
5:     ▷ On next line, (g, pk), (l', l − i · g) $\in G_1 \times G_1$, as product group
6:     p  RINGSIGNATURE[((g, pk))](msg = m, pks = $\{(l', l - i \cdot g)\}_{i=0}^{3}$, sk = x)
7:     return l', l, p, x      ▷ Implicitly a struct with these fields
8: function PROVEDLKNOWLEDGE(m $\in \cup_{l=0}^{\infty} \{0, 1\}^l$, h $\in G_1$, b $\in \mathbb{Z}_q$)

-continued

Algorithm 1: Construction of a Publicly-Verifiable Secret Share

```
 9:     c, k ← 0, 0
10:     while c ≡ 0 mod q ∨ c > 5q do        ▷ Want c ∈_R Z_q \ {0}, uniformly
11:         k ∈ Z_q
12:         c ← H(m‖h‖b · h‖k · h)
        return c, k − cb                      ▷ Implicitly a struct with these fields
13: function SHARE(m, f(x) = Σ_{i=0}^t a_i x^i ∈ Z_q[x], j, k ∈ Z_q, pk ∈ G_1)   ▷ pk is j's public key
14:     C_i ← a_i · g for i = 0, . . . , t
15:     m_l ← m‖(C_i)_{i=0}^t‖k‖j‖l for l = 0, . . . , 127     ▷ k is index of sending node
16:     b_l ← lth bit pair of f(j) for l = 0, . . . , 127      ▷ j is index of receiving node
17:     B_l ← ELGAMALBITPAIR(m_l, b_l, pk) for l = 0, . . . , 127
18:     b ← Σ_{l=0}^{127} 4^l (B_l.x)                          ▷ B_l.x is ElGamal blinding key in B_l
19:     PB_l ← B_l\x for l = 0, . . . , 127                    ▷ Remove secret x field from b_l's
20:     c,s ← PROVEDLKNOWLEDGE(m‖{C_i}_i‖k‖j‖{PB_l}_l, pk ,b)
21:     sPK ← TRANSLATEKEY(f(j)).
22:     oPR ← TRANSLATEKEY(a_0)
23:     return (C_i)_{i=0}^t, (PB_l)_{l=0}^{127}, (c, s), j, (sPK, oPK)     ▷ Implicitly a struct with these fields
```

Verify: $CD \times G_1 \times Z_q \to \{true, false\}$. Run by all players on all shares. Given a share output σ from Share(f(x), j, pk), Verify(σ, pk, j,) = true iff the share is consistent with the value for f(j) implied by the share's polynomial commitments, and the proofs that the ElGamal ciphertexts encode bit ddit are valid. See the section "Validity Check for a Share" above, for a description of Verify.

Algorithm 2: Share-verification algorithm

```
 1: function VERIFYELGAMALBITPAIR(m, l, l', pk, c_0, s_0, s_1, s_2, s_3)
 2:     return VERIFYRINGSIGNATURE((g, pk))(msg = m, pks = {(l', 1 − b · g)}_{b = 0}^3, c_0, s_0, s_1, s_2, s_3 )
 3: function VERIFYDLKNOWLEDGE(m, h, pk, a, c, s)
 4:     c' ← H(m‖h‖a‖s · h + c · pk)
 5:     return (c' ≡ c mod q) ∧ (c' < 5q)
 6: function VERIFY(m, (C_i)_{i=0}^t, (B_l)_{l=0}^{127}, (c, s), pk, j, k, (sPK, oPK))
 7:     if c= 0 ∨ s = 0 ∨ c ≥ 5q then
 8:         return false                              ▷ c might not be sampled uniformly
 9:     if ¬VERIFYTRANSLATION(C_0, oPK) then
10:         return false                              ▷ Translation of PVSS secret key invalid
11:     φ ← Σ_{m=0}^t j^m · C_m                       ▷ Putative f(j) · g
12:     if ¬VERIFYTRANSLATION(sPK, φ) then
13:         return false                              ▷ Translation of target's subkey invalid
14:     σ ← (Σ_{k=0}^{127} 4^k · B_k, 1) − φ          ▷ Putative combined ElGamal blinding factors
15:     if ¬VERIFYDLKNOWLEDGE(m‖{C_i}_i‖k‖j‖{B_l}_l, pk, σ, c, s) then
16:         return false                              ▷ Σ_{k=0}^{127} 4^k · l_k does not encode f(j)
17:     for l = 0, . . . 127 do
18:         m_l ← m‖(C_i)_{i=0}^t‖k‖j‖l
19:         p ← VERIFYELGAMALBITPAIR(m_l, B_l.l, B_l.l', pk, B_l.p.c_0, B_l.p.s_0, B_l.p.s_1, B_l.p.s_2, B_l.p.s_3)
20:         if ¬p then
21:             return false                          ▷ lth ciphertext does not encode a bit pair for pk
22:     return true
```

Decrypt: (σ, sk, j) ∈ $CD \times Z_q \times Z_q \to Z_q$. Decrypt a share σ player j from player k, obtaining the share $f_k(j)$.

Algorithm 3: Decryption algorithm

```
function DECRYPT(m, (C_i)_{i=0}^t, (B_l)_{l=0}^{127}, (c, s), sk, j, k, (sPK, oPK))
    pk ← sk · g
    if ¬VERIFY(m, (C_i)_{i=0}^t,(B_l)_{l=0}^{127}, (c, s), pk, j, k, (sPK, oPK)) then return ⊥
    for l = 0, . . . . 127 do
        plain ← B_l.l − sk · B_l.l'
        if plain ∈ {0, 1 · g, 2 · g, 3 · g} then
            b_l ← log_g (plain)                       ▷ Feasible due to if condition
        else
            return ⊥
    return Σ 4^l b_l
```

Multiply: $(f(j_i) \cdot p, j_i)_{i=0}^t = \in (G_1 \times Z_q)^{t+1} \to 7 f(0) \cdot p$. Return the scalar multiple of a point $p \in G_1$, given multiples of p by the shares $f(j_i)$ from $t + 1$ distinct players $j_i$. Uses Lagrange interpolation. Each honest player sends around a complete list of shares for each player. Share sets are valid if each share is valid, and they all commit to the same secret polynomial. In Algorithm 4 below, ss{j_i} refers to the share for player $j_i$ in a share set ss.

In addition to the above functionality, an implementation of the following interface must be provided. If the key output from the DKG is the desired final product, this implementation can be trivial. However, for BLS signatures, we'll want to translate keys from $G_1$ to $G_2$.

TranslateKey: $Zq \; 7 \to G$. In the trivial case, G={0}, and TRANSLATEKEY( )=0. For a pairing system, $G_1$ is the base curve, G is its twist (i.e., $G_2$), and TRANSLATEKEY (sk)=sk·$g_G$.

The leader sends the public key and digests in a report to all participants, once it has received signatures on the report from (n+f)/2 participants (FINAL message.)

Honest participants broadcast the final report to each other (FINAL-ECHO message), and once a node has received more than f echos, it queues the report for transmission on-chain.

Each participant moves to the next epoch and, as long as no key has appeared on-chain, repeats the above pro-

---

Algorithm 4: multiplying a point by the distributed-secret scalar. The pji's are the partial products f(ji) · p.

```
function MULTIPLY((p_{j_i}, j_i)_{i=0}^t)
    if j_i's not unique then return ⊥
    S    {share sets used in distributed key}
    j_iSubKey   ·Σ_{ss∈S} ss[j_i], sPK for i = 0, . . . , t    ▷ Compute f(j_i) · g_2, (ss[j_i],sPK is j_i's partial public key.)
    if ∃i | e(p_{j_i}, g_2) ≠ e(p, j_iSubKey) then              ▷ Check that log_p p_{j_i} = log_{g_2} j_iSubKey
        return ⊥                                                                    ▷ p_{j_i} ≠ f(j_i) · p return Σ_{i=0}^t (Π_{m∈∪_i l_i \ ∪_i l_i} (-m)/(j_i - m)) · p_{j_i}                ▷ f(0) · g_2
```

---

VerifyTranslation: (pk,opk)∈ $G_1 \times G \; 7 \to$ {true,false}. In the trivial case, VERIFYTRANSLATION (_,_)=true. In the pairing case, VERIFYTRANSLATION (pk,opk)= (e(pk,$g_2$)==e($g_1$,opk)), where e is the bilinear pairing.

The steps below accomplish distributed key generation (DKG) using a publicly verifiable secret sharing protocol. The description of each step ends with the corresponding message in OCR. The message contents and their verification are described in more detail below. As in OCR, participants are assumed to sign messages with individual public keys, and verify signatures on all received messages. There are two phases to the protocol: First, a key-generation phase, then a share-dissemination phase. Nodes determine which phase they're in from the on-chain contract state: If no key has been published onchain, yet, they're in key-generation. Otherwise, they're in share dissemination.

- All nodes are notified in some way (similar to a config-change message in OCR) that a new key is to be generated. They are informed of the contact info and public-key credentials for all participating nodes. These initial public keys should come with proofs of knowledge of exponent, since they are used in zero-knowledge proofs of homomorphically encrypted values, in the secret shares.
- The leader for the first epoch sends out a request for shares. (OBSERVE-REQ message.)
- Nodes construct their polynomial commitments and shares. (algorithm 1 and the key-generation branch of the OBSERVE OCR plugin method described in algorithm 6.)
- All participants send the shares/commitments back to leader in their OBSERVE message, and the leader sends them back out to all participants once it has responses from at least f+1 participants. Participants store all valid share sets in the report, indexed by hash.
- All participants verify the shares they receive from the leader (see algorithm 2 and the key-generation branch of the report plugin method described in the algorithm 72), and send an aggregated, signed report back to the leader (REPORT message), as long as the number of participants in the shares is at least f+1. They store all valid share sets, indexed by hash digest, and the final report is comprised of the public distributed key, and a list of the digests of the share sets used to construct the key.

cess from the OBSERVE message in step 1, continuing to send the shares they created for the initial OBSERVE message.

Once the key appears on-chain, nodes still respond to OBSERVE messages, but they send a random share set selected from the share-set digests included in the on-chain report, instead of their own shares.

In this new share-dissemination phase, the leader still sends out the share-sets it receives as a report request, but now nodes only check for share sets mentioned in the on-chain digest list, and never send back a report.

The leader continues to send OBSERVE-REQ messages until halted, allowing time for all nodes to receive all shares needed to reconstruct their share of the distributed key.

For communication with client code, the DKG communicates its key data to client processes through the following interface, for which an implementation must be provided:

KeyInvalidated: KeyID7→ø. Called when a new key is requested by a SETCONFIG event on the DKG contract, to indicate that any key associated with the specified KeyID is now invalid.

NewKey: (KeyID, KeyData)7→0. Called when the DKG has settled on a new key, in view of the local node. The KeyData contains the public shares for all players, and the secret share for the local player.

While the DKG ensemble can be used to generate distributed keys for multiple key IDs, care must be taken to avoid concurrent requests, as the ensemble is only designed to handle one key generation at a time. Given the anticipated cadence of generating a new DKG about once a week, this should not be a serious limitation. In the event of concurrent requests, the request which arrives second will simply destroy the first request, which does not entail a safety violation.

Algorithms 5 through 8 below describe the methods which implement the generalized-OCR interface. The DKG is expected to serve some client process which will use the distributed key (such as the VRF service described below.)

Client services should implement the following interfaces, the first offchain, the second onchain:

```
// DKGClient's are called when there is new information about the
keyID they are // associated with.
//
// WARNING: IMPLEMENTATIONS MUST CHECK THAT CALLS
COME FROM THE EXPECTED DKG CONTRACT interface DKGClient
is KeyDataStruct {
// newKeyRequested is called when a new key is requested for the
given keyID, // on the DKG contract. Function newKeyRequested( )
external;
// keyGenerated is called when key data for given keyID is reported
on the DKG // contract.
Function keyGenerated(KeyData memory kd) external;
}
``` initialization by passing the KeyConsumer implementation to NewReportingPluginFactory.

The key/digest list which first makes it on-chain is the consensus on the distributed public key, and the shares which comprise it. Essentially, the underlying blockchain provides the (eventual) consensus mechanism.

Since the onchain contract only accepts a report with at least $(n+f)/2$ signatures on the report with the key/digests, there must be at least $(n-f)/2$ honest nodes which stored all the shares involved in any key which makes it on-chain. Therefore, all honest nodes will eventually receive all shares during the share-dissemination phase, because the honest nodes which received all the shares will pick a different set to share at random each round. At least $2n/3$ nodes will be honest and capable of disseminating all the shares, and

---

Algorithm 5 DKG initialization algorithm (describes the state used by subsequent method algorithms and assumes the VSS player index is one greater than the node's oracleID.)

---

Require: oracleID $\geq 0$    ▷ Cannot allow 0 for player index
Require: t >= f    ▷ DKG threshold must equal or exceed OCR threshold
  function INIT(self, sk, n, t. $(pk_i)_{i=1}^n$, oracleID,cfgDgst,keyID, keyConsumer, contract, translator)
   self.n, self.t   n, t
   self.sk = sk    ▷ Secret key for this node
   self.pks[i] ← $pk_i$ for i = 1, ..., n    ▷ $pk_i$ is public key for player i
   self.k ← oracleID + 1    ▷ Player index for self
   self.cfgDgst ← cfgDgst    ▷ Domain-separation tag
   self.keyID ← keyID    ▷ Tracks key announcement/invalidation
   self.keyConsumer ← keyConsumer    ▷ Announces keys/invalidation
   self.shareSets ← { }    ▷ Observed shares, indexed by hash
   self.anyShareSet ← ⊥    ▷ Shares dealt by this node
   self.mySSSig ← ⊥    ▷ Signature on my ShareSet
   self.contract = contract    ▷ On-chain contract for key consensus
   self.translator = translator    ▷ PUBKEYTRANSLATION instance
   keyConsumer.KeyInvalidated(keyID)    ▷ Announce new key requested for keyID
   contract.keys[keyID] = ∅    ▷ Actually done during setConfig
   Inform onchain chents old key is invalidated    ▷ Actually done during setConfig
// KeyConsumer is the interface client services should implement in order to be
// informed of the DKG's behavior type
KeyConsumer interface {
// Called when a new key is requested. Client should invalidate any existing // keys.
KeyInvalidated(contract.KeyID)
// Called when a new key is available. KeyData contains local share in // addition to distributed public key.
NewKey(contract.KeyID, *KeyData)
}

---

Onchain, the list of clients served by the onchain DKG contract can be updated using the addClient and removeClient methods. Offchain, the client can be specified on $t<n/2$, so for $n=31$, $t=10$, $f=10$, the probability of all shares being disseminated by to all honest nodes after 10 dissemination epochs run 10 honest leaders is roughly 99.997%.

---

Algorithm 6: OBSERVE method.

--- function STORENEWSHARESET(self)
  $a_i \in_R$ n $\mathbb{Z}_q$ for i = 0, ..., self.t    ▷ Sample secret coefficients
  $f(x) \leftarrow \sum_{i=0}^{self.t} a_i x^i$
  c   self.configDigest
  self.myShareSet   $[SHARE(c, f(x), j, self.k.self.pks[j])]_{j=1}^{self.n}$
  self.myTranslations   $(self.translator.Translation (f(j)))_{j=1}^{self.n}$
  sigMsg   (self.cfgDgst, self.myShareSet, self.myTranslations)
  self.mySSSig   SIGN(sigMsg, self.sk)
function OBSERVE(self)
  if self.contract.key = ⊥ then    ▷ In key-generation phase
   if self.myShareSet = ⊥ then    ▷ Generate shares once per generation
    STORENEWSHARESET(self)
  k, shares, σ   self.k, self.myShareSet, self.mySSSig
  translations   self.myTranslations

Algorithm 6: OBSERVE method.

```
    res ← {k, shares, σ, translations}           ▷ Record punning
    self.shareSets[H (rec)] = rec
  else                                            ▷ In data-availability phase
    rec ∈_R {ss ∈ self.shareSets|H(ss) = self.contract.digests}
  return rec
```

Algorithm 7: REPORT method

```
function VALIDSHARESET(self, ss)                 ▷ True iff ss is consistent/complete
  if self.shareSets[H(ss)] ≠ ⊥ then return true   ▷ Already validated
  fullShareSet ← SORTED(s.j|s ∈ ss.shares) = [1,....self.n]
  singleDealer ← LEN({s.k|s ∈ ss.shares}) = 1     ▷ Same dealer, all shares?
  singlePolynomial  LEN({(s.C_i)_{i=0}^{self.t}|s ∈ ss.shares}) = 1
  if ¬(fullShareSet ∧ singleDealer ∧ singlePolynomial) then
    return false                                  ▷ Exit early if simple checks failed
  if ¬VERIFYSIG((self.cfgDgst, ss.shares, ss.translations), self.pks[ss.k], ss.σ) then
    return false                                  ▷ Must be signed by dealer
  c ← self.configDigest
  v ← (s → VERIFY(c, (s.C_i)_{i=0}^{self.t}, (s.B_l)_{l=0}^{127}. (s.c, s.s)pk_{s,j}, s.j, s.k, (s.sPK, s.oPK)))
  return ∀s ∈ ss.shares, v(s)                     ▷ Fail if any share in ss is invalid
function REPORT(self, shareSets, sigs, repctx)
  validSharesSets ← {ss ∈ shareSets|VALIDSHARESET(self, ss)}
  for as ∈ validSharesSets do                     ▷ Store all valid shares, regardless of
phase
    self.shareSets[H(ss)] ← ss
  keyGen.Phase, d ← self.contact.keys[self.keyID] = ø), self.contract.digests
  if keyGenPhase then
    shares ← {ss ∈ validSharesSets|ss.k corresponds to sender OracleID}
    if LEN(shares) > self.t then
      key ← Σ_{ses hares} s.C_0
      digests ← {H(s)}_{ses hares}
      self.keyConsumer.NewKey(self.keyID, key, digests)
      return self.keyID, key, digests             ▷ OCR framework provides final signature on
report
```

Algorithm 8: Accepting and transmitting finalized report

```
function SHOULDACCEPT FINALIZEDREPORT
  (self, shares, sigs, repet.r)
return true
function SHOULDTRANSMITACCEPTEDREPORT
  (shares, sigs, repet.r)
return (self.contract.key = Ø)
```

Algorithm 9: Share construction by iterating over the shares referenced in the on-chain contract, decrypt the shares for this node, and sum the resulting values.

```
function CONSTRUCTDISTRIBUTEDSHARE(self)
  missingShare ← (∃h ∈ self.contract.digests|self.shares[h] = ⊥)
  if (self.contract.key = ⊥) ∨ missingShare then return ⊥
  share ← 0)
  for h ∈ self.contract.digests do
    s. = {s ∈ self. shares[h].shares|s.j = self.k}    ▷ Unique share
    c = self.configDigest
    share+ = DECRYPT(c. (s.C_i)}_{i=0}^{self.t}.(s.B_l)_{l=0}^{127}.
      (s.c.s.s),self.sk, s.j.s.k. (s.sPK, s.oPK))
  return share
```

A verifiable randomness generation (VRF) protocol can run as its own generalized OCR and can include the following steps:

After the leader sends its observe request out, followers send back their partial signatures on any seeds in RandomnessRequest logs they've observed buried sufficiently deeply in the blockchain.

Leader sends back all responses those in a report request.

Followers verify the partial signatures and collate them by request, and send back the VRF outputs and proofs for any requests for which enough valid partial signatures have been included in the request. The proofs are as described in the Aggregate Signature Verification section.

Leader sends the report back out to the followers with the OCR onchain signatures included. Note, however, that this is only to simplify integration with OCR. The OCR onchain signatures are unnecessary, since the VRF proofs are publicly verifiable.

Followers place report on their transmission queues.

When it's a follower's turn to transmit the report, they send the VRF proofs onchain in individual transactions, if they haven't already been fulfilled. Alternatively, the transmissions could be batched, which would save computing resources, since the proofs can be verified in aggregate, as described below in the description of aggregate signature verification.

BLS signatures (and VRF proofs, which are essentially BLS signatures) work by hashing data to the group/curve, and then multiplying the hash point by a secret key. The VRF method of the parent application used a pick-and-try algorithm to hash to the curve: it would interpret the hash as an x ordinate, and check whether $\sqrt{x^3+7}$ was a square in the base field. If it was, the hash point was $(x, x^3+7)$. If it wasn't, it would deterministically modify the hash and try again until it was. Roughly 50% of field elements are squares, so the number of hashes it would have to try is geometrically distributed, and effectively unbounded. This potentially unbounded resource requirement can lead to operational issues, because, for example, no matter how high the gas limit is set for VRF submissions, there is always a chance that this hash-to-curve algorithm would require more. It's possible to set the gas limit so high that the probability of this failure is negligible, but a failure can still occur when moving to MATIC, where the usage is so frequent that the failure frequency became unacceptably high. Accordingly, a constant-gas hash-to-curve algorithm can be used. The proof that this leads to a distribution of points indistinguishable from uniform is considerably more involved than for the pick-and-try algorithm. Equations for this method are discussed below.

Let m be the message to hash. This algorithm requires two hashes into the base field Fp. We set $h^0(m,n)=keccak256(h^0(m,n-1))$ for n>0, and $h^0(m,0)=keccak256$ (m). We take $h_1(m),h_2(m)$ to be the first two entries in $h^0(m,0),h^0(m,1),\ldots$ which, as big-endian uint256's, are less than 5p, and so reduce with uniform distribution to elements of Fp. Under the random-oracle assumption, the probability that $h^0(m,n)<p$ is approximately 94.5%, so it's cryptographically infeasible (at 128 bits of difficulty) to have a run of consecutive $h^0(m,n) \geq 5p$ longer than 32.[8] Since keccak256 costs 36 gas, this means we can bound the gas usage for this phase by 32×36=1152 gas. (The expected cost after computing $h^0(m,0)$ is approximately 2*36×(1+1/20)=76.2 gas)

That obtains two values $h_1(m),h_2(m) \in Fp$. We define $f: t \in Zq \to G_1$ by computing $$x_1 = v = \frac{-1+\sqrt{-3}}{2} - \frac{\sqrt{-3} \cdot t^2}{1+b+t^2}$$

$$x_2 = 1 - v$$

$$x_3 = 1 - \frac{(1+b+t^2)^2}{3t^2}$$

and choosing the first of these values $x_i$ forwhich $x_i^3+3$ is a square, and setting $f(t)=(x_i, \pm\sqrt{x_i^3+b}) \in G_1$. The branch $\pm\sqrt{x_i^3+b}$ can be selected to lie above or below according to where t lies. Finally, the hash-to-curve value is $f(h_1(m))+f(h_2(m))$.

This can be made more efficient by computing the inverse of $1+b+t^2$ and the pseudo square roots:

$$x_i^{\frac{p+1}{4}}_{\frac{p+1}{4}}$$

offchain and passing them as parameters of the proof. $X_i$ is a square iff $$\left(x_i^{\frac{p+1}{4}}\right)^2 = x_i,$$

and otherwise $$\left(x_i^{\frac{p+1}{4}}\right)^2 = -x_i,$$

so it's easy to verify that the correct pseudo square root has been provided, up to a minus sign. Due to this uncertainty, we should fix $\pm\sqrt{x_i^3+b}$ to always lie below p/2.

Generalized OCR is also used for Boneh-Lynn-Shacham (BLS) signing and VRF output. For this, a TBLSSignature instance is initialized on all nodes, with the base point base $\in G_1$ to be multiplied by the distributed-secret scalar. No on-chain interaction is necessary, here, because consensus is ensured by the existence of a single, efficiently verifiable answer.

The standard OCR ContractTransmitter functionality is written with transmission of a single onchain report in mind, but the VRF report potentially includes multiple proofs to be individually transmitted to the contract. Since it's possible some of those proofs will have already been transmitted by other oracles, it's necessary to check for each one prior to transmission. The OCR method ShouldTransmitAcceptedReport can't be used for this purpose, because it returns a single boolean, and individual proofs in the report it receives may or may not have already been successfully transmitted. We therefore implement a default ContractTransmitter for the VRF workflow, and require OCR clients to implement a new interface:

```
type VRFContractTransmitter interface {
// Check whether the given requestID is fulfilled, and if not send the report
// onchain for validation and provision to the requesting contract.
TransmitVRFResponse( context.Context, types.ReportContext, types.Report,
RequestID,
) error
LatestConfigDigestAndEpoch( // Same as ContractTransmitter method
ctx context.Context,
) (
configDigest types.ConfigDigest,
epoch uint32,
err error,
)
FromAccount( ) types.Account // Same as ContractTransmitter method
}
```

In addition OCR clients must implement the following interfaces, which are included for generalization to exotic blockchains (implementations for Ethereum-Virtual-Machine-based blockchains are provided):

```
type ProofConstructor interface {
    // Return the serialized byte representation of the specified proof, as
    // expected by the onchain machinery.
    SerializeVRFProof
    ( requestID RequestID, pubKey kyber.Point, hp altbn_128.HashProof,
    ooutput kyber.Point, blockNum uint64, numWords uint32, sender types.Account,
    ) ([ ]byte, error)
    // Retrieve RequestID from serialized proof ProofRequestID(r [ ]byte) (RequestID,
    error)
    // Length of a proof (they are assumed to be of constant length)
    ProofLength( ) int
    }
type CommitmentConstructor interface {
    // Return the index under which v is stored in the onchain contract, which is
    // also used to calculate the final VRF seed. Commitment(v AbstractVRFRequest)
    [32]byte
}
```

The implementation of the ContractTransmitter. Transmit method is then expressed by algorithm 10 below.

Algorithm 10: ContractTransmitter. Transmit method

```
function INIT(self,vrfContract Transmitter,prover)
    self.transmitter ← vrfContractTransmitter
    self.prover ← prover
function TRANSMIT(self, report)
    for i = 0;i < self.prover.ProofLength; i ++ do
        proof ← report[i : i + self.prover.Proof Length]
        self.transmitter.TransmitV RF Response(proof)
```

Algorithm 11: TBLSSignature initialization algorithm. Describes the state used by subsequent method algorithms.

function INIT($self, t, keyID, keyProvider, contract, dropAge, respondAge, retransmissionDelay, prover, committer$)
self.t ← t ∈ ℕ                              ▷ Number shares needed for signature
self.keyID ← keyID                          ▷ Used for tracking key updates
self.keyProvider  keyProvider               ▷ Listens for key updates
self.contract = contract                    ▷ Onchain VRF contract
self.dropAge ← dropAge                      ▷ Ignore requests in blocks older than drop Age
self.respondAge  respond.Age                ▷ Ignore requests in blocks younger than respond Age
self.transmissionTime = make(map[Request ID]time.Time)    ▷ Track when responses transmitted
self.retransmissionDelay ← retransmission Delay    ▷ $How\ long\ to\ wait\ before\ attempting\ retransmission\ of\ a\ VRF\ response$
self.prover ← prover                        ▷ Serializes signature
self.committer ← committer                  ▷ Computes hash of request Algorithm 12: Observe method for TBLSSignature

```
function PENDINGREQUESTS(self)    ▷ Implemented via OnchainContract interface
    correctAge  (request → self.respondAge ≤ request.block.age ≤ self.dropAge)
    return { r ∈ { Local view of unfulfilled SigRequest events on self.contract } | correctAge(r) }
function OBSERVE(self)
    keyData  self.keyProvider.KeyLookup(self.keyID)
    it key Data = ⊥ then                  ▷ Key unknown to local node; no observation
        return ∅
    output: ← [ ]
    retransmissionThreshold ← MAX(0, Now - self.retransmissionDelay)
    for r ∈ PENDINGREQUESTS(self) do
```

-continued

---

Algorithm 12: Observe method for TBLSSignature

---

```
if self.transmissionTime.get(r.id, 0) < retransmissionThreshold then
    hashToCurve ← r.HashPoint          ▷ Not transmitted recently: sign for transmission now
    sigShare ← keyData.SecretShare.Mul(hashToCurve)    ▷ (secretshare×) · hashToCurve
    outputs.append({requestID: r.requestID, sigShare: sigShare})
return outputs                         ▷ Strictly speaking, the serialized outputs
```

---

Algorithm 13: Report method for TBLSSignature. e(·, ·) is the AltBN-128 pairing.
req.HashProof(hash— method) hashes the requested seed to the curve, and includes some intermediate
values which make the proof easier to verify onchain.

---

```
function OnchainProof(keyData, req, sig)
    hp ← req.HashProof(self.committer)       ▷ Committer computes the same request hash as onchain contract
    f₁, f₂ ← hp.SummandProofs                 ▷ Proofs for f(h₁(m)), f(h₂(m)) ∈ G₁. (See Section 7.1,)
    proof ← Proof{keyData.PubKey, hp.input, sig, f₁, f₂}  ▷ Corresponds to strust Proof in VRF.sol
    return self.prover(proof)                 ▷ Serializes proof for onchain transmission
function Report(self, {outputsᵢ}ᵢ₌₁ᵐ)
    keyData ← self.keyProvider.KeyLookup(self.keyID)
    if keyData = ⊥ then                       ▷ Key unknown to local node; no observation
        return ∅
    reqs ← {unfulfilled SigRequest events on self.contract, in view of local node}
    requestsByReqID ← {r.requestID: r for r ∈ reqs}
    contributionsByReqID ← map[RequestID]map[Observer]G₁Point{ }
    keyData ← self.keyProvider.KeyLookup(self.keyID)
    for (i, oᵢ) in enumerate({outputsᵢ}ᵢ₌₁ᵐ) do
        for (reqID, sigShare) ∈ oᵢ do
            if reqID ∈ requestsByReqID then
                hashToCurve ← r.HashProof( ).HashPoint
                if e(hashToCurve, keyData.Shares[i]) = e(sigShare, g₂) then
                    contributionsByReqID[reqID][i] = sigShare  ▷ valid since sigShare = secretShareᵢ · hashTo-
Curve
    report ← [ ]
    for (reqId, shares) in contributionsByReqID.items( ) do
        if LEN(shares) > self.t then
            tshares ← shares.items( )[: self.t + 1]   ▷ Lagrange interpolation of sk · hashToCurve on next line
```

$$\text{sig} = \text{SUM}\left(\text{PROD}\left(\frac{-m}{j-m} \text{ for } (m.\_) \text{ in } tshares \text{ if } m \neq j\right) \cdot sj \text{ for } (j, sj) \text{ in } tshares\right)$$

```
        report.append(OnchainProof(keyData.PublicKey, contributionsByReqID[reqId], sig))
    return report
```

---

Algorithm 14: Accepting a finalized report for TBLS Signature.

---

```
function SHOULDACCEPTFINALIZEDREPORT(self, report)
    for proof ∈ report do
        self.transmissionTime[proof.RequestID] ← Now
    return true
```

---

Algorithm 15: Transmitting an accepted report for TBLS Signature.

---

```
function SHOULDTRANSMITACCEPTEDREPORT(self, report)
    return true
```

A signature can be verified on-chain using precompiled contract 0x8. The contract is passed the hashed-to-curve value b∈ $G_1$ (which is verified against the message under signature, m), and the signature p∈ $G_1$, and already knows the generator $g_2$∈ $G_2$ and the public key pk∈ $G_2$. The points are represented in uncompressed affine coordinates, and passed to contract 0x8 laid out as $$(-bx, -by, pkx, pky, px, py, g2, x, g2, y) \in (G1 \times G2)2.$$

This returns 1 if e(b,pk)=e(p,$g_2$), and zero otherwise. That equality is true for a correct signature, because e (b,pk)=e (b,sk·$g_2$)=sk·e(b,$g_2$)=e(sk·b,$g_2$)=e(p,$g_2$)

---

Algorithm 16: Simple on-chain BLS signature check

---

```
function BLSVERIFY(m, σ)
    b ← HASHTOCURVE(m)
    return CONTRACT0x8(-bₓ, -bᵧ, pkₓ, pkᵧ, pₓ, pᵧ, g₂,ᵣ, g₂,ᵧ) = 1
```

To securely check multiple signatures in an aggregated manner, the Fiat-Shamir heuristic can be used: given base points $b_1 \ldots b_r$ and corresponding signatures $p_1 \ldots p_r$ against the public key pk, set $s_1$=H(BLS−coefficientskpkk$b_1$k . . . k$b_r$k$p_1$k . . . k$p_r$), and $s_i$=H($s_{i-1}$) for i=2 . . . , r. Then a single check using contract 0x8 on b=$^P_i s_i \cdot b_i$, p=$^P_i s_i \cdot p_i$, can be applied as described above. If the individual signatures are correct, we still have p=sk·b, since $p_i$=sk·$b_i$ for each i. If any are incorrect, the probability (under the random-oracle assumption for H) that p=sk·b is approximately[3] 1/q, so it is computationally infeasible for a bounded adversary to construct a set of putative signatures which check out in aggregate. An addition of two points a+b is done by contract 0x6 given memory $(a_x,a_y,b_x,b_y)$, where $p_x,p_y$ are big-endian representations of the affine coordinates of p. A multiplication s·a is done by contract 0x7 givenmemory $(a_x,a_y,s)$.

[3]Since H's output is uniformly distributed over $\{0, \ldots, 2^{256}-1\}$, its output modq is not uniformly distributed over $Z_q$, so the probability of p landing on sk·b (which is uniformly distributed over $G_1$, given correct construction of the key and the adversary's complete ignorance of it) is a bit less than 1/q.

Alternatively, a potential approach for handling multiple VRF requests is for all nodes to take the requests in some fixed range of block heights, and combine them in a single hash-to-curve, then sign that point, and "stretch" the resulting randomness by using that point as a CSPRNG seed. This would be cheaper and simpler to implement, but harder to reason about, because it inextricably links the VRF output to blockchain behavior, forcing us to include the blockchain in reasoning about VRF security.

The VRF process/system listens, onchain and offchain, to an ongoing DKG process and implements the interfaces described above. When notified that a new key has been requested of the DKG, the VRF process discards its current key and ceases to serve VRF proofs using that key. When notified that a new key is available, the process records the new key and any necessary local shares, and begins serving proofs using the new key. Temporary inconsistencies are possible in the view of the current key, both in a local node's and across nodes. However, the eventual consistency of all key views is ensured by the DKG's use of its onchain contract as an eventual consistency mechanism.

Applicants have conducted a security analysis of the methods disclosed above by applying the following theorems for proofs of correctness for PVSS/DKG.

Theorem 1 (Completeness)

$(sk_1,p_1) \ldots (sk_n,p_n)$=KeyGen( ), ... KeyGen( ), f(x)=GenPoly( )

ddistinct$\{j_i\}^t_{k=0} \subset \{1, \ldots n\}$, and sshares $(\sigma_j=$Share$(f(x),j_l, p_{jl}))_{l=0}^t$, we have;

1. Verify $(j_l,pk_{jl},\sigma_l)$=true for all l.
2. Multiply$(((\text{Decrypt}(\sigma_{jl},sk_{jl},j_l)\cdot p),j_l)_{l=0}^t)$ runs without error and returns $f(0)\cdot p$.

Proof. Let $a_i$ be the ith coefficient of f, so $\sigma_i.C_i=a_i\cdot g$, by the definition of SHARE, algorithm 1, line 14. Thus in line 11 of VERIFY, algorithm 2, we have $$\phi = \sum_{m=0}^{t} j^m \cdot C_m = \sum_{m=0}^{t} j^m \cdot (a_m \cdot g) = \left(\sum_{m=0}^{t} a_m j^m\right) \cdot g = f(j) \cdot g$$

From line 17 of Algorithm 1 above, we have $\sigma_l.l_k=x_k\cdot pk_{jl}+b_k\cdot g$, where $b_k$ is the kth bit pair of $f(j_l)$ (line 16) and $x_k$ is a randomly sampled scalar (line 2.) Therefore, the SHARE calculation knows the discrete log of $\Sigma_{l=0}^{127}4^l x_k$, which it uses in the PROVEDLKNOWLEDGE call on line 20 of the SHARE pseudocode. Thus VERIFYDLKNOWLEDGE on line 15 returns true.

From line 6 of Algorithm 1 above, and the logic in ELGAMALBITPAIR, each $B_t$ contains a ring signature in the subgroup of $G_1 \times G_1$ generated by (g,pk), where pk is the public key to which the bit pair is The keys in the signature are $(1^0,1)$ and $(1^0,1-g)$. From lines 2-4, of Algorithm 1, one of these keys is of the form x·(g,pk), i.e., the calculation knows the secret key, so the ring signature succeeds. Thus, the ring-signature check on line 19 of VERIFY succeeds for each bit pair. Thus, all checks in VERIFY succeed, so Verify$(j_l,pk_{jl},\sigma_l)$=true for all l, as in the theorem statement.

In view of the above, the VERIFY call in line 3 of Algorithm 3 succeeds, and $(B_l.1^0,B_l.1)$ encrypts the lth bit pair of f(j). Therefore, the DECRYPT calls in Multiply $(\text{Decrypt}(\sigma_{jl},sk_{jl},j_l)\cdot p),j_l)_{l=0}^t)$ evaluate to Multiply$(((f(j_l)\cdot p), j_l)_{l=0}^t)$, which evaluates to f(0), because Multiply is exactly the evaluation at 0 of the Lagrange interpolation for f.

Theorem 2 (Soundness). Given shares $(j_k,pk_{jk},\sigma_k)^t_{k=0} \in (Zq \times G_1 \times CD)^{t+1}$, with distinct $j_k$'s and $pk_{jk}$'s generated by KeyGen, identical coefficient commitments $(\sigma_k.C_i)_{i=0}^t$, and Verify $(j_k,pk_{jk},\sigma_k)$=true for all k, There is unique a degree-t $f(x) \in Zq[x]$ such that the coefficient commitments match the coefficients of either the ElGamal ciphertexts for $\sigma_k$ encode the bit pairs of $f(j_k)$, so that Decrypt$(\sigma_k,sk_{jk},j_k)$=$f(j_k)$, or the creator of $\sigma_k$ knows the secret key $sk_{jk}$ such that $p_{jk}=sk_{jk}\cdot g$.

As a proof, let $a_0, \ldots, a_t$ be the discrete logs base g of the commitments $C_0, \ldots, C_t$. The unique f is then the polynomial with coefficients. $f(x)=\Sigma_{i=0}^t a_i x^i$. Since Verify $(j_k,pk_{jk},\sigma_k)$=true for all k, by algorithm 2, VERIFYELGAMALBITPAIR on line 19 is true for each $\sigma_k.B_l$. Since the VERIFYELGAMALBITPAIR call in VERIFYELGAMALBIT checks a ring signature with candidate keys $\{(1',1-g)\}^3_{b=0}$ in the subgroup $(g,pk_k) \in G_1 \times G_1$, assuming the creator of the signature does not know the secret key $sk_{jk}=\log_g pk_{jk}$, it must know a value $x \in Zq$ such that $x\cdot(g, pk_{jk}) \in \{(1^0,1-b\cdot g)\}^3_{b=0}$, so that each $(1^0,1)=(\sigma_k.PB_r.1^0, \sigma_k.PB_r.1)$ is the ElGamal encryption of either 0 or 1, under the public key $pk_{jk}$(0 if the signature is from $(1^0,1)$, 1 if it's from $(1^0,1-g)$, etc.)

Since Verify $(j_k,pk_{jk},\sigma_k)$=true for all k, by Algorithm 2, VERIFYDLKNOWLEDGE on line 15 is true. Thus if the creator of $\sigma_k$ does not know $sk_{jk}=\log_g pk_{jk}$, they must know $b \in Zq$ such that $(\Sigma_{d=0}^{127} 4d\cdot B_d.1)-(\Sigma_{m=0}^t j_k^m\cdot C_m)=b\cdot p_{jk}$. (Assuming $\sigma_k$ is derived via Algorithm 2, this b is the b on line 18 of Algorithm 1.)

Since $(\Sigma_{m=0}^t j_k^m\cdot C_m)=f(j_k)\cdot g$, the VERIFYDLKNOWLEDGE check means that $\Sigma_{d=0}^{127}4^d\cdot 1_k=b\cdot p_{jk}+f(j_k)\cdot g$. That is a Pedersen commitment by $\sigma_k$'s creator to $f(j_k)$ (assuming the creator does not know $sk_{jk}$.) It follows that each $(\sigma_k.PB_r.1^0, \sigma_k.PB_r.1)$ is the ElGamal encryption of the rth bit pair of $f(j_k)$, and thus that Decrypt$(\sigma_k,sk_{jk},j_k)$=$f(j_k)$. Note that if the creator of $\sigma_k$ is not player $j_k$ yet somehow knows $sk_{jk}$, player $j_k$ is faulty.

Theorem 3 (Privacy)

Given $\sigma$=Share (f(x),j,pk), and assuming the Discrete Log Problem is hard, $\sigma$ reveals nothing (to a computationally bounded adversary which does not $F^*_{q^{12}}$ know sk=$\log_g$ pk) about $f(x) \in Zq[x]$ except $f(j)\cdot g$ and that the commitments of f's coefficients$\{a_i\}_{i=0}^t$ are $\{a_i\cdot g\}$.

As a proof, this follows from the facts that:

1. Under the discrete log assumption $f(j)\cdot g$ and the $a_i\cdot g$'s provide negligible information about f(j) and the a's to a computationally bounded adversary.
2. An ElGamal ciphertext is indistinguishable from random to an adversary which does not know the secret key for which it's encrypted, because the blinding factor is an arbitrary, uniformly-distributed group element which cannot be recovered due to the Diffie-Hellman assumption.
3. A ring signature contains no information about which key in the ring was used, because any other key in the ring could be used to construct the exact same signature.

As a result, each encrypted bit pair in a PVSS share contains no information about which bit it represents, to a party which does not know the secret key for which the share is encrypted. Note that the privacy theorem implies that this is a traditional Feldman Verifiable Secret Share, with a particularly verbose scheme for encrypting the shares, so that they are verifiable as consistent. Therefore, the usual security guarantees for the Feldman VSS, and by extension the Pedersen DKG, all hold. In particular, the arguments in Theorems 1 "Secure Distributed Key Generation for Discrete-Log Based Cryptosystems" by Gennaro, Jarecki, Krawczyk and Rabin, 2007 (incorporated herein by reference) can be applied giving the following lemma:

Lemma 4 is a well known lemma that can be applied to simulability of an adversary's view of DKG. Let A be a static adversary algorithm which runs in the context of the above DKG protocol, in control of at most t players. Without loss of generality, assume that players $1, \ldots, t$ are the adversary-controlled players, their public keys are $pk_1, \ldots, pk_t$, and their corresponding secret keys are $sk_1, \ldots, sk_t$. Sample $h \in_R G_1$ and $x_1, \ldots, x_t \in_R Zq$. Under the Random Oracle Model, there is a procedure for sampling a set of putative PVSS "shares" $\sigma_1, \ldots, \sigma_t \in_R D$ (h, $x_1, \ldots, x_t$), such that:

1. $\forall i \in \{1, \ldots, t\}$, Verify ($\sigma i$, pki,i)=true
2. $\forall i \in \{1, \ldots, t\}$, $\sigma i$. $C_0$=h
3. $\forall i,j,k \in \{1, \ldots, t\}$, $\sigma_i \cdot C_k = \sigma_j \cdot C_k$
4. $\forall i \in \{1, \ldots, t\}$, Decrypt($\sigma i$, ski, i)=$x_i$
5. The distribution of "shares" generated by the game $h \in_R G_1$,
$x_1, \ldots, x_t \in_R Zq$,
$\sigma_1, \ldots, \sigma_t \in_R D$ (h, $x_1, \ldots, x_t$)

is computationally indistinguishable to the adversary from the distribution of shares generated by an honest player.

It is desirable to convince a potential attacker that the public key of the secret share of some honest player is some h of unknown discrete log, and use this lemma to trick the attacker into solving a Diffie-Hellman challenge involving h.

Proof. The shares are sampled using slight modifications to SHARE (algorithm 2) as follows:

Let $\lambda_{jk}$ for $k \in \{1, \ldots, t\}$ be the "Lagrange interpolation" coefficients such that for any polynomial $$f(x) = \sum_{j=0}^{t} a_j x^j \in \mathbb{Z}|q[x], a_j = \sum_{k=0}^{t} \lambda_{jk} f(k).$$

Then the coefficient commitments of the sampled PVSS "shares", are $C_0$=h, $C_j = \lambda_{j0} \cdot h + \Sigma_{k=1}^{t} \lambda_{jk} x_k \cdot g$. The polynomial these commit to, call it f, satisfies f(0)=$\log_g$ h (but note that knowledge of the log is not required to construct the commitments) and f(k)=$x_k$ for k=1 . . . , t. In SHARE for the share encrypted to player $p \in \{1, \ldots, f\}$ with public key pk, the bit pairs $b_l$ from line 16 of Algorithm 1 are set to the corresponding bit pairs of $x_p$ and passed to ELGAMALBIT-PAIR as usual to produce $(\tilde{B}_l)_{l=0}^{127}$. In place of PROVEDL-KNOWLEDGE on line 8, it samples c,s$\in_R Zq$, and computes $\sigma = (\Sigma_{k=0}^{127} 4k \cdot B_k \cdot 1) - \Sigma_{m=0}^{r} j^m \cdot C_m$ (from lines 11 and 14 of Algorithm 2), then assigns H(mkpkk$\sigma$ks·h+c·pk)=c. This is sufficient for VERIFYDLKNOWLEDGE on line 3 of Algorithm 2 to pass. This (c,s) is then passed as the "proof" that the share encodes $x_p$=f(p).

Note that h's sampling distribution is the same as for the sampling process $x_0 \in_R Zq$,h $x_0 \cdot g$ (i.e., uniform distribution), so the commitments $C_i$ seen by the adversary are distributed as if $$x_0, \ldots, x_t \in_R \mathbb{Z}_q, f(x) \leftarrow \sum_{k=0}^{t} \lambda_{jk} \overline{x_k},$$

and then f(x) is passed to SHARE as the secret polynomial. The map $$(x_0, \ldots, x_t) \in \mathbb{Z}_q^{t+1} \mapsto \sum_{k=0}^{t} \lambda_{jk} \overline{x_k} \in \{f \in \mathbb{Z}_q[x] | \deg f = t\}$$

is a linear bijection (it is the inverse of the Vandermonde operator, which has non-vanishing determinant because $1, \ldots, t$ are distinct), which therefore carries the uniform distribution to itself. Since an honest player chooses $f \in_R \{f \in Zq[x] | \deg f=t\}$ as its secret polynomial, the distribution of the commitments $C_i$ and the bit-pair proofs $PB_l$ (from line 19 of Algorithm 1) are distributed as for an honest player. Moreover, in these "shares," c,s$\in_R$ Zq, whereas in PROVEDLKNOWLEDGE, they uniformly distributed due to the Random Oracle assumption and the fact that k$\in_R$ Zq. Thus the full "share" is distributed identically to an honest share.

Lemma 5 can be applied to show that a potential adversary knows nothing about distributed secret key. Let A be a static adversary algorithm which runs in the context of the above DKG protocol, in control of at most t players. In view of such an adversary, every value in Zq is equally likely, as the final distributed key.

As a proof, we must account for the possibility that the DKG protocol completes while the OCR leader is corrupt, and is therefore run by the adversary (and even an honest leader could include shares from all t corrupt players, if only by chance.) However, the shares the leader picks must be signed by at least f+1 OCR nodes before the resulting distributed key can be accepted by the system. This means that at least one honest node signs off on the shares. An honest node requires at least t+1 shares from distinct players to be included in the key, so at least one share must come from an honest player.

Moreover, by the Privacy theorem above, the adversary can only decrypt the shares meant for its players. Since there are only t of them, this means that the adversary at best learns that an honest player's secret-share polynomial lies a uniform-probability codimension-t subspace S of the (t+1)-dimensional Zq vector space {f$\in$Zq[x]|degf=t}, namely, assuming without loss of generality that the corrupt player indices are $1, \ldots, t$, $S=\{f \in Zq[x] | \deg f=t \wedge \forall j \in \{1, \ldots, t\}, f(j)=$
$\text{Decrypt}(\sigma_j, sk_j, j)\}.$ Moreover, since no constraint is placed on f(0)=0, $\forall a \in Zq$, $\exists f \in S | f(0)=a$ (such f can be constructed by Lagrange interpolation, and all a are equally likely, given construction of a share by an honest player.) Stated differently, the adversary learns nothing about the shared secret of an honest player (which is the constant coefficient of its secret polynomial.) This means that the adversary's view of the distributed secret key includes addition of an arbitrary a $\in_R$Zq, meaning every possible key is equally likely from the adversary's perspective, no matter what contributions it makes to its own additive shares of the key.

Theorem 6 can be applied to demonstrate unforgeability). Let D be a static adversary algorithm which—given the public key pk from a pair (pk,sk) generated by the above DKG protocol, in which A controlled up to t participants—can feasibly forge a BLS signature on any message m given $q_H$ hash queries (under the Random Oracle Model) and $q_S$ pre-forgery signature queries. Then the Computational Diffie-Hellman problem is feasible in the group over which the signatures are defined.

In other words, the BLS signature protocol with a distributed key is EUF-CMA secure, and under the assumption that no algorithm (t', ε')-breaks Computational Diffie-Hellman, there is no algorithm which (t'', ε'') breaks the signature protocol with $$t'' < t' + 2(\log q)c_A(q_H + ((t+1)(t_{exp} + t_{add}) + 2t_{net})q_S) + c_I + (n-1)c_R$$

$$\epsilon'' < \frac{\epsilon'}{2eq_S},$$

where $c_A$ is a small constant, $t_{exp}$ is the time to do a group scalar multiplication, $t_{add}$ is the time to do a group addition, $t_{net}$ is a bound on message-transmission latency, ci is the time necessary to run a DKG setup as described above, $c_R$ is the time necessary to run recovery of a PVSS secret, and e is Euler's number.

As a proof, recall that the computational Diffie-Hellman problem is, given unknown $a, b \in_R Zq$ and known $(g, a \cdot g, b \cdot g)$, find $ab \cdot g$.

Assuming an adversary F with an appreciable chance of forging a BLS signature on a distributed key x constructed from random shares $x_i \in_R Zq$ for each player i, using only the contributions of at most t corrupted players. (If contributions from more than t corrupted players are involved, the threshold is met, and the signature can proceed as normal.) Without loss of generality, assume the corrupted players' indices are 1, ..., t. (Note that this restricts the scope of the proof to static adversaries.)

A simulator SIM can take Diffie-Hellman challenge $(g, a \cdot g, b \cdot g)$ and uses the Simulability Lemma above to simulate the adversary's view (i.e., the views of players 1, ..., t) of the DKG as usual for players t+1, ..., n−1, but simulates its view of player n so that the public key for the secret it shares is $a \cdot g$. Note that this is not the same as its public key for the shared secret, $^P_i f_i(n) \cdot g$, this is the public key for the constant term of its secret polynomial, i.e. $a_{n0} \cdot g = C_{n0}$, in the notation we used to describe the PVSS above. Since at least t+1 shares are used in the construction of the distributed secret, at least one of the shares used comes from an honest player, and we may assume it's player n without loss of generality.

The Random Oracle assumption in the Simulability Lemma means that SIM controls the hash-to-scalar function H, and it is modeled as a random oracle. For messages m where the simulation does not constrain H, a value $h \in_R Zq$ is sampled, and $H(m)$ h. Where $H(m)$ is constrained, it is important for the random oracle property that the value assigned to it is nonetheless distributed uniformly in Zq in view of the adversary. Similarly, SIM controls a hash-to-curve function $H_C: U_{l=0}^\infty \{0, 1\}^l \to G_1$, and may select a value $H_c(m)p \in_R G_1$ for any new bit message m.

Let P be the set of players whose shares are included in the simulated distributed key, including player n, so the public key for the distributed secret key is $pk = a \cdot g + \Sigma_{p \in P\setminus\{n\}} C_{p0}$. P could contain corrupt players, and their shares to other corrupt players could be invalid, even though they pass the Verify function, because a corrupt player j could share its secret key $sk_j$. However, the system only accepts a player's shares if there is a share for all n players, and all the shares have consistent coefficient commitments and pass the Verify function. This means that even a corrupt player must produce consistent shares for all n−t honest players, so any (t+1)-sized subset of the honest players can reconstruct $\log_g C_{p0}$, for any $p \in P$, whether corrupt or not.

Next, SIM runs simulation algorithm $A_6$ on F as described in "Short signatures from the Weil pairing", Boneh, Dan and Lynn, Ben and Shacham, Hovav, 2001 (incorporated herein by reference), using $b \cdot g$ as the hash to be signed. This computes the answer to the Diffie-Hellman challenge $(g, a \cdot g + \Sigma_{p \in P\setminus\{n\}} C_{p0}, b \cdot g)$. i.e. $\sigma = \underline{ab} \cdot g + \Sigma_{p \in P\setminus\{n\}} a_{p0} \cdot (b \cdot g)$. As part of $A_6$, F may make signature requests on $q_S$ messages $m_1, \ldots, m_{q_S}$.[4] Note that the first term $ab \cdot g$, is the answer to the Diffie-Hellman challenge put to SIM.

Finally, SIM simulates Lagrange interpolation by t+1 uncorrupted players to compute $\Sigma_{p \in P\setminus\{n\}} a_{p0}$, and from there, $\Sigma_{p \in P\setminus\{n\}} a_{p0} \cdot (b \cdot g)$ It then subtracts that from $\sigma$ to obtain the answer to the original Diffie-Hellman challenge.

An algorithm which breaks the threshold BLS signature thus reduces to a Diffie-Hellman solver with roughly the same efficiency as an algorithm which breaks regular BLS signatures, and approximately the same difficulty estimates from the Gap Signature Security Theorem apply, except that (1) constants must be added to the time bound on $t^0$ to account for DKG setup and up to n−1 PVSS secret recoveries, and (2), the $q_S$ legitimate signature queries will involve t+1 scalar multiplications, one for each player participating in the signature, t additions to combine those multiplications, and time for the leader to send the signature request out to the players and for the players to respond with the answer.

In principle, the threshold VRF could operate almost as a drop-in replacement for the cryptographic component of the single-oracle VRF described in U.S. patent application Ser. No. 17/317,490 and briefly described above.

Generalized OCR can be used for BLS signing and VRF Beacon output. Like in the VRF described in Ser. No. 17/317,490, a TBLSSignature instance can be initialized on all nodes, with the base point $g \in G_1$ to be multiplied by the distributed-secret scalar. No on-chain interaction is necessary, here, because consensus is ensured by the existence of a single, efficiently verifiable answer.

The VRF of disclosed implementations provides a VRF output for an arithmetic sequence of block heights ("slots"), as long as that output is requested by some client. The OCR system processes only slots older than a confirmation-delay threshold in view of a quorum of the VRF committee. An example workflow for the OCR system in accordance with disclosed implementations is as follows:

A Leader node (randomly selected) sends out OBSERVEREQ.

Follower nodes (other nodes on the decentralized oracle network) determine which blocks, in their local view of the blockchain, still need VRF proofs, and construct their partial proofs for them (i.e., partial BLS signatures on the blockhash, roughly speaking.) They identify properly funded client callback requests which the onchain system needs to serve, and how much should be charged for them. They send all this information back to the leader in an OBSERVE message.

After a reasonable delay, leader aggregates the partial VRF proofs of those blocks for which a quorum of followers have provided them. It also identifies callback requests for which a quorum of followers have indicated require onchain service and provided consistent billing information. It sends all this information in a REPORTREQ message, which includes the hash for a block at least as old as the blocks in all of the proofs.

Followers validate, construct and ECDSA-sign the REPORT message corresponding to the REPORTREQ received, and send their signatures back for transmission by the leader, as usual. The REPORT message is primarily a serialization of the VRFBeaconReport.Report solidity struct.

Leader transmits the report along with signatures to the VRFBEACONCOORDINATOR, the coordinator verifies the signatures as usual, and checks that the included blockhash comes from a sufficiently recent block and matches the blockhash for that height as recorded onchain.

The proofs do not need to be directly verified onchain, based on the trust assumption that a quorum of participants are honest, and therefore will not sign a REPORTREQ message with an invalid VRF proof. A hash from a block at least as old as the ones in the report is included so that the report cannot be replayed on a forked chain with different blockhashes for some of the proofs. Including the blockhash in the report allows us to avoid changing the OCR signature logic, which does not explicitly include a method for adding a domain separator.

The offchain system should track which blocks have received their VRF output, a task which is complicated by the possibility of re-orgs. The system is required to periodically reattempt transmission of previously transmitted VRF outputs and callbacks if the output is not registered onchain for some reason. To this end, clients can implement the following interface:

```
// CoordinatorInterface provides access to the onchain
VRFBeaconCoordinator // contract state.
type CoordinatorInterface interface {
// ReportBlocks returns the heights and hashes of the blocks which require VRF
// proofs in the current report, and the callback requests which should be
// served as part of processing that report. Everything returned by this
// should concern blocks older than the corresponding confirmationDelay.
// Blocks and callbacks it has returned previously may be returned again, as
// long as retransmissionDelay blocks have passed since they were last
// returned. The callbacks returned do not have to correspond to the blocks.
//
// The implementor is responsible for only returning well-funded callback
// requests, and blocks for which clients have actually requested
random output //
// This can be implemented on ethereum using the RandomnessRequested and
// RandomnessFulfillmentRequested events, to identify which blocks and
// callbacks need to be served, along with the NewTransmission and
// RandomWordsFulfilled events, to identify which have already been served.
```

-continued

```
ReportBlocks(
    ctx
    context.Cont
    ext,
    slotInterval uint16, // VRF output for block heights divisible by slotInterval
        confirmationDelays map[uint32]struct{ }, retransmissionDelay
    time.Duration,    maxBlocks,    maxCallbacks int, //
) (
    blocks [ ]Block,
    callbacks [ ]AbstractCostedCallbackRequest,
    err error,
)
// ReportWillBeTransmitted registers to the CoordinatorInterface that the
// local node has accepted the AbstractReport for transmission, so that its
// blocks and callbacks can be tracked for possible later retransmission
ReportWillBeTransmitted(context.Context, AbstractReport) error
// DKGVRFCommittees returns the addresses of the signers
// and transmitters // for the DKG and VRF OCR committees. On
ethereum, these can be retrieved // from the most recent
ConfigSet events for each contract.
DKGVRFCommittees(context.Context) (dkg, vrf OCRCommittee, err
error)
// ProvingKeyHash returns the VRF current proving key, in view of the local
// node. On ethereum this can be retrieved from the VRF contract's attribute
// s_provingKeyHash
ProvingKeyHash(context.Context) (common.Hash, error)
// BeaconPeriod returns the period used in the coordinator's contract
BeaconPeriod(ctx context.Context) (uint16, error)
}
```

Note that all methods which involve querying external state also include a context. Context argument, and return an error field, both elided here for brevity. In addition to surfacing the blocks and callbacks which the report needs to include, implementers of this interface are responsible for tracking the billing for callbacks and filling out the related fields in each AbstractCostedCallbackRequest. This is passed onchain to the billSubscriberForCallback method, which is currently a stub which can be filled in with the billing logic. Clients can also implement the following interface to express how the report should be serialized for transmission onchain.

```
type AbstractCostedCallbackRequest struct {
    BeaconHeight        uint64 //
    ConfirmationDelay   uint32
    SubscriptionID      uint64
    Price  *big.Int
    RequestID    uint64
    NumWords     uint16
    Requester    common.Address
    Arguments    [ ]byte
    GasAllowance        *big. Int
    RequestHeight       uint64
    RequestBlockHash common.Hash
} type AbstractVRFOutput struct {
    BlockHeight uint64 //
    ConfirmationDelay uint32
    VRFProof [32]byte
    Callbacks [ ]AbstractCostedCallbackRequest
}
```

```
type ReportSerializer interface {
    // Return the serialized byte representation of the report, as
    // expected by the onchain machinery.
    SerializeReport(AbstractReport) ([ ]byte, error)
    DeserializeReport([ ]byte) (AbstractReport, error)
    // Return the longest possible report which can be passed onchain
    MaxReportLength( ) uint
    // Return the predicted length of the output from SerializeReport
    ReportLength(AbstractReport) uint
}
In order to fill in the JuelsPerFeeCoin field of AbstractReport, clients
can also provide an implementation of:
type JuelsPerFeeCoin interface {
    // JulesPerFeeCoin returns the exchange rate for a unit of onchain gas
    JulesPerFeeCoin( ) (*big. Int, error)
    // AggregateValues returns the aggregated value of the received array
of values
    AggregateValues([ ]*big. Int) (*big.Int, error)
}
Finally, in order to fill in the RecentBlockHeight/RecentBlockHash fields,
clients must provide an implementation of:
type Blockhashes interface {
    // Return a list of the recent blocks whose hashes are currently cheaply
    // verifiable onchain, in view of the local node. (On Ethereum, these are the
    // last 256 blocks, verifiable via the BLOCKHASH opcode.)
    OnchainVerifiableBlocks( ) (startHeight uint64, hashes [ ]common. Hash)
    // CurrentHeight returns the current height of the chain in view of the local
    // node. (Height of the most recent block)
    CurrentHeight( ) uint64
}
```

Blockhashes from OnchainVerifiableBlocks can be passed as part of the OCR OBSERVE messages, and the report uses the most recent blockhash from these lists that a quorum of the observations agree on. The client implementations of these interfaces are all passed on creation of the local OCR process, represented by a TBLSSignature. The confirmationDelays are passed to the onchain VRFCoordinator via the onchainConfig argument of its setConfig method. Algorithm 17 below describes the state used by subsequent method algorithms and Algorithm 18 below checks that OCR configs and distributed keys are in sync. Algorithm 19 below reports TBLSSignature. Algorithm 20 below accepts and tramsits finalized reports Algorithm 17: TBLSSignature initialization algorithm

```
function INIT(self, t, keyID, keyProvider, slotInterval, confirmationDelays,
              retransmissionDelay, coordinator reportSerializer, juelsPerFeeCoin, blockhashes)
    self.t← t ∈ N                                          ▷ Number shares needed for signature
    self.keyID ← keyID                                     ▷ Used for tracking key updates
    self.keyProvider ← key Provider                        ▷ Listens for key updates
    self.slotInterval ← slotInterval
    self.confirmationDelays  confirmation Delays           ▷ Num blocks to wait before providing VRF share
    self.retransmissionDelay   retransmission Delay        ▷ How long to wait before attempting retransmission of a VRF
response
    self.coordinator ← coordinator
    self.reportSerializer ← reportSerializer
    self.juelsPerFeeCoin ← juelsPerFeeCoin
    self.blockhashes ← blockhashes                         ▷ Reports new blockhashes
    self.latest.Report  ø
    self.latestSerializedReport ← ø
```

Algorithm 18: Observe method for TBLSSignature

```
function OCRSSYNCED(self)              ▷ Check that OCR configs and distributed keys are in sync
    dkg. vr f = self.coordinator.DKGVRFCommittees( )
    key   self.keyProvider.KeyLookup(self.keyID).PublicKey
    if key = ⊥ then
        return ø                                           ▷ DKG process not ready, in view of local node
    return (keccak256(key) = self.coordinator.ProvingKeyHash( )) ∧ (dkg = vrf)
function OBSERVE(self)
    if ¬OCRSSYNCED(self) then
        return ø
    blocks, callbacks ← self.coordinator.REPORTBLOCKS(
            self.slotInterval, self.confirmationDelays, self.retransmissionDelay)
```

-continued

---

Algorithm 18: Observe method for TBLSSignature

---

Sanity-check blocks and callbacks w.r.t. confirmation delays vs current height
output ← [ ]
for b ∈ blocks do                                          ▷ Contains height, hash and confirmation delay
   hashPoint HashToCurve(b)
   sigShare ← keyData.SecretShare.Mul(hash Point)
   outputs.push((block, sigShare))
startHeight, recentHashes ← self.blockhashes.OnchainVerifiableBlocks( )
j ← self.juelsPerFeeCoin.JuelsPerFeeCoin( )
return outputs, callbacks, startHeight, recent Hashes, j ▷ Strictly speaking, the serialization of this

---

Algorithm 19: Report method for TBLSSignature. e(·, ·) is the AltBN-128 pairing.

--- function Report(self, {(outputs$_i$, callbacks$_i$, startHeights$_i$, recentHashes$_i$, j$_i$)}$_{i \in \{responding\ oracles\}}$)
  if ¬OCRsSynced(self) then
    return Ø
  callbacksByBlock ← defaultdict(lambda : set ( ) )
  for cb ∈ {callbacks observed by more than self.t × 2 nodes} do
    callbacksByBlock[cb.BeaconOutputHeight, cb.ConfirmationDelay].add(cb)
  contributions    defaultdict(lambda : dict( ))       ▷ {block : {OradeID : share}}
  for i ∈ responding oracles do
    for (block, sigShare) ∈ outputs$_i$ do
      hashPoint ← HashToCurve(block)
      if e(hashPoint, keyData.Shares[i]) = e(sigShare, g$_2$) then
        contributions[block][i] = sigShare       ▷ valid since sigShare = secretShare$_i$ · hashPoint
  for (b, shares) in contributions.items( ) do
    if LEN(shares) > self.t then
      tshares    shares.items( )[: self.t + 1]       ▷ Lagrange interpolation of sk · hashPoint on next line $$\text{sig} = \text{SUM}\left(PROD\left(\frac{-m}{j-m}\ \text{for}\ (m.\_)\ \text{in}\ tshares\ \text{if}\ m \neq j\right) \cdot sj\ \text{for}\ (j, sj)\ \text{in}\ tshares\right)$$

h, d ← b.Height, b.ConfirmationDelay
      aggOutputs.append(AbstractVRFOuptut{h, d, sig, callbacksByBlock[h, d]})
  for any (height, delay) in callbacksByBlock not already in aggOutputs do
    v    AbstractVRFOutput{height, delay, Ø, callbacksByBlock[height, delay]}
    aggOutputs.append(v)         ▷ Blank VRF proof indicates output is already stored onchain
  recentHeight, recentHash ← youngest (height,block) in more than self.t × 2 of recentHashes$_i$
  juels ← median of {j$_i$}
  self.latestReport ← AbstractReport{aggOutputs, juels, recentHeight, recentHash}
  self.latestSerializedReport ← self.reportSerializer.SerializeReport(self.latestReport)
  return self.latestSerializedReport

---

Algorithm 20: ShouldAcceptFinalizedReport and
ShouldTransmitAcceptedReport methods for TBLSSignature.

---

Algorithm 20 ShouldAcceptFinalizedReport and
ShouldTransmitAcceptedReport methods for TBLSSignature.
  function SHOULDACCEPTFINALIZEDREPORT(self, report)
    if report = self.latestSerializedReport then
      self.coordinator.ReportWillBeTransmitted(self.latestReport))
      return true
    return false
  function SHOULDTRANSMITACCEPTEDREPORT(self, report)
    return report = self.latestSerializedReport In disclosed implementations, a smart contract requests randomness, in the manner described above, from a decentralized network of oracles which, in response, provides a report to the smart contract which is used to generate a random number, which is then sent to the smart contract on-chain. As a result of the verifiable randomness, even if one or more oracle nodes are compromised, the oracle nodes cannot manipulate and/or supply biased data. Disclosed implementations can use Goldberg's Verifiable Random Function (VRF) which is available as open source code. The "random" in "verifiable random function" means "entirely unpredictable (uniformly distributed) to anyone who doesn't know the seed or secret key." A VRF can be thought of as the public-key version of keyed cryptographic hash. Only the holder of the VRF secret key can compute the hash, but anyone with the public key can verify the correctness of the hash. The disclosed implementations also include novel elements that adapt known VRFs to a decentralized environment. The VRF secret key can be a number the oracle chooses from, for example, the uniform distribution on {O, . . . , #secp256k1-1}, in a cryptographically secure way. Where, secp256k1 is the elliptic curve used by the Ethereum blockchain for cryptography. Associated with this secret key is a public key, which is used to identify the oracle.

Disclosed implementations provide a decentralized network of oracle nodes that respond to requests for verified randomness to provide on-chain verifiable randomness, combined with the ability to cost-efficiently have thousands of nodes providing VRF's uptime/availability are obtained. By allowing a wider ecosystem of nodes to participate in VRF random number generation, a globally distributed network of node operators that are economically incentivized to both generate and broadcast verifiable random data on-chain is achieved. The responses from the VRF are verifiable on-chain and have extreme uptime/availability. The disclosed implementations can be combined with Verifiable Delay Functions (VDF), i.e., functions that require a moderate amount of sequential computation to evaluate, but once a solution is found, the correctness thereof can be easily verified, and other methods of generating randomness, both on-chain and off-chain.

FIG. 1 illustrates a system architecture and method for generating a randomness function in accordance with the disclosed implementations. Decentralized network 110 (such as a blockchain network) includes a shared ledger 114 on which transactions are recorded in a conventional manner. At 1, smart contract 112 executing on the decentralized network 110 sends a request for a randomness function to decentralized oracle network 120. In this example decentralized oracle network 120 includes oracle nodes 120-1, 120-2 . . . 120-n. At 2a/2b, responsive to the request for a randomness function, Node 120-1 (the leader node designated in the manner described above) sends an observe request to follower nodes (120-2 . . . 120-n). At 3a/3b, each of the follower nodes constructs one or more partial proofs for a randomness function sends the one or more partial proofs for a randomness function to the leader node. Each partial proof can include a block indicator and a hash of the block indicated by the block indicator; At 4a/4b, the leader node aggregates the partial VRF proofs for which a predetermined quorum of the follower nodes have provided and sends a report request message to the follower nodes. The report request message can include the hash for a block at least as old as the oldest block indicated by the block indicators. At 5a/5b, each of the follower nodes validates and signs a report response message corresponding to the report request message and sends the report response message including a verifiable randomness function to the leader node. At 6/6b, the leader node verifies the report response message and sends it to the follower nodes. At 7, the follower nodes broadcast the verified report response message to smart contract 112 executing on the decentralized network.

The disclosed implementations can be implemented by various computing devices programmed with software and/or firmware to provide the disclosed functions and modules of executable code implemented by hardware. The software and/or firmware can be stored as executable code on one or more non-transient computer-readable media. The computing devices may be operatively linked via one or more electronic communication links. For example, such electronic communication links may be established, at least in part, via a network such as the Internet and/or other networks.

A given computing device may include one or more processors configured to execute computer program modules. The computer program modules may be configured to enable an expert or user associated with the given computing platform to interface with the system and/or external resources. By way of non-limiting example, the given computing platform may include one or more of a server, a desktop computer, a laptop computer, a handheld computer, a tablet computing platform, a Smartphone, a gaming console, and/or other computing platforms.

The various data and code can be stored in electronic storage devices which may comprise non-transitory storage media that electronically stores information. The electronic storage media of the electronic storage may include one or both of system storage that is provided integrally (i.e., substantially non-removable) with the computing devices and/or removable storage that is removably connectable to the computing devices via, for example, a port (e.g., a USB port, a firewire port, etc.) or a drive (e.g., a disk drive, etc.).

The electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media.

Processor(s) of the computing devices may be configured to provide information processing capabilities and may include one or more of a digital processor, an analog processor, a digital circuit designed to process information, an analog circuit designed to process information, a state machine, and/or other mechanisms for electronically processing information. As used herein, the term "module" may refer to any component or set of components that perform the functionality attributed to the module. This may include one or more physical processors during execution of processor readable instructions, the processor readable instructions, circuitry, hardware, storage media, or any other components.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

While implementations and examples have been illustrated and described, it is to be understood that the invention is not limited to the precise construction and components disclosed herein. Various modifications, changes and variations may be made in the arrangement, operation and details of the method and apparatus disclosed herein without departing from the spirit and scope of the invention defined in the appended claims.

What is claimed:

1. A method for providing a randomness function to a smart contract on a decentralized network, the method comprising:
  receiving, by an oracle network comprised of a plurality of decentralized nodes, a request for at least one random value to be supplied to a smart contract executing on the decentralized network;
  (a) in response to the request for at least one random value, a leader node of the plurality of decentralized nodes sending an observe request to follower nodes of the plurality of decentralized nodes;
  (b) each of the follower nodes constructing one or more partial proofs for a randomness function;
  (c) each of the follower nodes sending the one or more partial proofs for a randomness function to the leader node, wherein each partial proof includes a block indicator designating a block on the decentralized network and a hash of the block indicated by the block indicator;
  (d) aggregating, by the leader node the one or more partial proofs for a randomness function for which a predetermined quorum of the follower nodes have provided;
  (e) sending, by the leader node, a report request message to the follower nodes, wherein the report request message includes the hash for a block on the decentralized network that is at least as old as the oldest block indicated by the block indicators;

(f) validating and signing, by each of the follower nodes, a report response message corresponding to the report request message;

(g) each of the follower nodes sending the report response message including a verifiable randomness function to the leader node;

(h) verifying, by the leader node, the report response message;

(i) sending, by the leader node, the verified report response message to the follower nodes; and (j) broadcasting, by the follower nodes, the verified report response message to a smart contract on the decentralized network.

2. The method of claim 1, wherein steps (a)-(j) are repeated in a sequence of epochs and wherein a new leader is selected from the plurality of decentralized nodes for each epoch.

3. The method of claim 1, further comprising generating secret shares for the nodes of the oracle network by applying an elliptic-curve algorithm over a group of the nodes of the oracle network comprising:
notifying the nodes that a new key is to be generated;
sending, by the leader node, a request for shares;
constructing, by the follower nodes respective polynomial commitments and shares and sending the commitments and shares to leader node;
sending, by the leader node a report including the commitments and shares to all follower nodes in response to receiving commitments and shares from at least f+1 follower nodes:
storing, by the follower nodes, all valid share sets in the report indexed by hash;
verifying, by the follower nodes, the shares and sending an aggregated, signed report back to the leader node;
sending, by the leader node, the public key and digests in a report to all follower nodes, in response to receiving signatures on the report from (n+f)/2, follower nodes; and
broadcasting, by each of the follower nodes, a final report to the other follower nodes and in response to receiving more than f echoes, queuing the final report for transmission
on-chain.

4. The method of claim 1, wherein the partial proofs for a randomness function are Boneh-Lynn-Shacham (BLS) signatures hash of the hash of the block indicated by the block indicator.

5. The method of claim 1, wherein the decentralized network is a blockchain network.

6. The method of claim 1, wherein the request for at least one random value comes from the smart contract.

7. A computer system for providing a randomness function to a smart contract on a decentralized network, the computer system comprising:
at least one computer processor; and
at least one memory device operatively coupled to the at least one computer processor and having instructions stored thereon which, when executed by the at least one computer processor, cause the at least one computer processor to carry out the method of:
receiving, by an oracle network comprised of a plurality of decentralized nodes, a request for at least one random value to be supplied to a smart contract executing on the decentralized network;

(a) in response to the request for at least one random value, a leader node of the plurality of decentralized nodes sending an observe request to follower nodes of the plurality of decentralized nodes;

(b) each of the follower nodes constructing one or more partial proofs for a randomness function;

(c) each of the follower nodes sending the one or more partial proofs for a randomness function to the leader node, wherein each partial proof includes a block indicator designating a block on the decentralized network and a hash of the block indicated by the block indicator;

(d) aggregating, by the leader node the one or more partial proofs for a randomness function for which a predetermined quorum of the follower nodes have provided;

(e) sending, by the leader node, a report request message to the follower nodes, wherein the report request message includes the hash for a block on the decentralized network that is at least as old as the oldest block indicated by the block indicators;

(f) validating and signing, by each of the follower nodes, a report response message corresponding to the report request message;

(g) each of the follower nodes sending the report response message including a verifiable randomness function to the leader node;

(h) verifying, by the leader node, the report response message;

(i) sending, by the leader node, the verified report response message to the follower nodes; and (j) broadcasting, by the follower nodes, the verified report response message to a smart contract on the decentralized network.

8. The system of claim 7, wherein steps (a)-U) are repeated in a sequence of epochs and wherein a new leader is selected from the plurality of decentralized nodes for each epoch.

9. The system of claim 7, wherein the method further comprises generating secret shares for the nodes of the oracle network by applying an elliptic-curve algorithm over a group of the nodes of the oracle network comprising:
notifying the nodes that a new key is to be generated;
sending, by the leader node, a request for shares;
constructing, by the follower nodes respective polynomial commitments and shares and sending the commitments and shares to leader node;
sending, by the leader node a report including the commitments and shares to all follower nodes in response to receiving commitments and shares from at least f+1 follower nodes:
storing, by the follower nodes, all valid share sets in the report indexed by hash;
verifying, by the follower nodes, the shares and sending an aggregated, signed report back to the leader node;
sending, by the leader node, the public key and digests in a report to all follower nodes, in response to receiving signatures on the report from (n+f)/2. follower nodes;
and broadcasting, by each of the follower nodes, a final report to the other follower nodes and in response to receiving more than f echoes, queuing the final report for transmission on-chain.

10. The system of claim 7, wherein the partial proofs for a randomness function are Boneh-Lynn-Shacham (BLS) signatures hash of the hash of the block indicated by the block indicator.

11. The system of claim 7, wherein the decentralized network is a blockchain network.

12. The system of claim 7, wherein the request for at least one random value comes from the smart contract.

* * * * *